(12) United States Patent
Cortinovis et al.

(10) Patent No.: US 12,385,470 B2
(45) Date of Patent: Aug. 12, 2025

(54) ENERGY STORAGE SYSTEM

(71) Applicant: GFM S.P.A., Mapello (IT)

(72) Inventors: Manuel Cortinovis, Albino (IT);
Danilo Vigano', Stezzano (IT);
Francesco Stortiero, Milan (IT);
Giambattista Castelli, Peia (IT)

(73) Assignee: GFM S.P.A., Mapello (IT)

( * ) Notice: Subject to any disclaimer, the term of this patent is extended or adjusted under 35 U.S.C. 154(b) by 607 days.

(21) Appl. No.: 17/759,891

(22) PCT Filed: Feb. 16, 2021

(86) PCT No.: PCT/IB2021/051282
§ 371 (c)(1),
(2) Date: Aug. 1, 2022

(87) PCT Pub. No.: WO2021/165823
PCT Pub. Date: Aug. 26, 2021

(65) Prior Publication Data
US 2023/0127282 A1    Apr. 27, 2023

(30) Foreign Application Priority Data
Feb. 20, 2020  (IT) .................. 102020000003539
Feb. 20, 2020  (IT) .................. 102020000003542

(51) Int. Cl.
*F03D 9/17*       (2016.01)
*F03D 9/00*       (2016.01)
(Continued)

(52) U.S. Cl.
CPC .............. *F03D 9/17* (2016.05); *F03D 9/007* (2013.01); *H02S 10/12* (2014.12); *H02S 10/20* (2014.12);
(Continued)

(58) Field of Classification Search
CPC . F03D 9/17; F03D 9/007; F03D 13/40; H02S 10/12; H02S 10/20; H02S 30/10;
(Continued)

(56) References Cited

U.S. PATENT DOCUMENTS

2008/0050234 A1*  2/2008  Ingersoll ............... F03D 9/17
                                                              290/55
2015/0267612 A1   9/2015  Bannari
(Continued)

FOREIGN PATENT DOCUMENTS

CN    104796064 B    3/2017
FR    2 864 174 A1   6/2005
(Continued)

OTHER PUBLICATIONS

International Search Report mailed on May 28, 2021 in PCT/IB2021/051282 filed on Feb. 16, 2021.

*Primary Examiner* — Paul Dinh
(74) *Attorney, Agent, or Firm* — Oblon, McClelland, Maier & Neustadt, L.L.P.

(57) ABSTRACT

An energy storage includes a first container including an inner space, a plurality of pressure vessels for compressed air that are stacked in rows inside the inner space of the first container, a tank containing a heat transfer fluid arranged inside the inner space of the first container, a compressor adapted to compress air, and a plurality of pneumatic ducts for compressed air connected to the compressor. The plurality of pneumatic ducts includes a plurality of heat exchangers adapted to enable a heat exchange between compressed air contained in the plurality of pneumatic ducts and heat transfer fluid contained inside the tank. The plurality of pneumatic ducts is connected to the plurality of pressure vessels supplying pressure vessels with compressed air, an electric turbine connected by the plurality of pneu-
(Continued)

matic ducts with the plurality of pressure vessels supplying compressed air for rotating the electric turbine to generate electric current.

20 Claims, 18 Drawing Sheets

(51) Int. Cl.
    *H02S 10/12*       (2014.01)
    *H02S 10/20*       (2014.01)
    *H02S 30/10*       (2014.01)
    *H02S 30/20*       (2014.01)

(52) U.S. Cl.
    CPC .............. *H02S 30/10* (2014.12); *H02S 30/20* (2014.12); *F05B 2220/602* (2013.01); *F05B 2220/708* (2013.01); *F05B 2240/142* (2013.01); *F05B 2260/02* (2013.01)

(58) Field of Classification Search
    CPC .... H02S 30/20; H02S 10/40; F05B 2220/602; F05B 2220/708; F05B 2240/142; F05B 2260/02; F05B 2240/211; Y02E 10/50; Y02E 10/72; Y02E 20/14; Y02E 60/16; Y02E 70/30; Y02T 10/70; Y02T 10/7072; Y02T 90/12; B60L 53/51; B60L 53/52; F05D 2220/60; F05D 2220/64; F05D 2220/76; F05D 2230/51; F05D 2260/02; F05D 2260/211; F05D 2260/213; F02C 6/16
    USPC ......................................................... 320/101
    See application file for complete search history.

(56) References Cited

U.S. PATENT DOCUMENTS

2018/0337632 A1    11/2018    Byrnes et al.
2019/0305720 A1    10/2019    Rogalka

FOREIGN PATENT DOCUMENTS

WO    WO 2010/125568 A2    11/2010
WO    WO 2013/003654 A2    1/2013

* cited by examiner

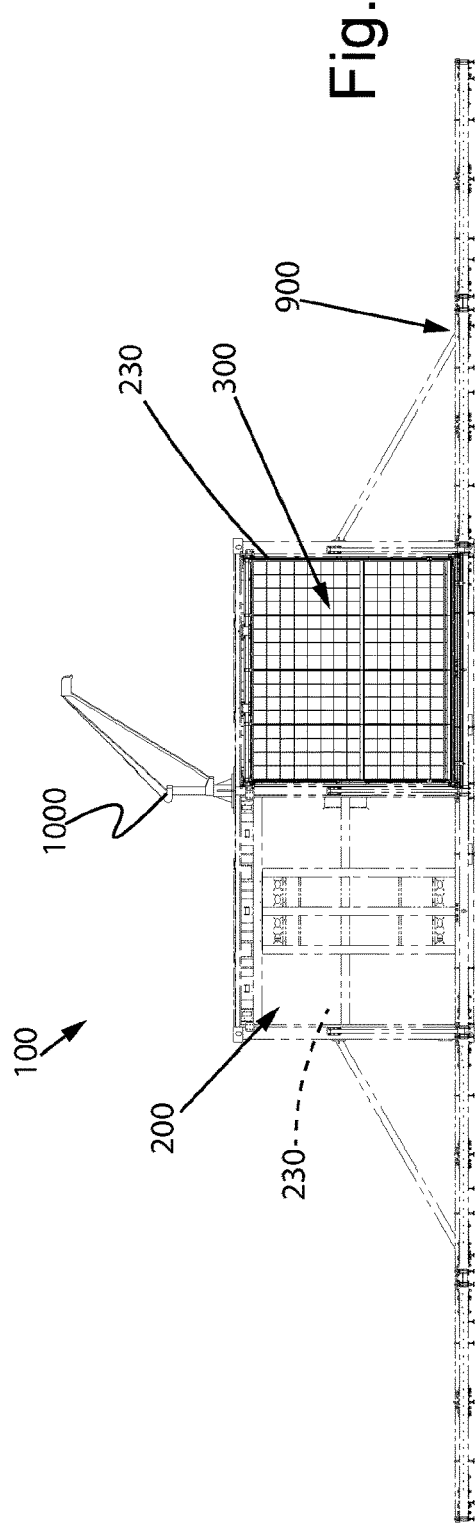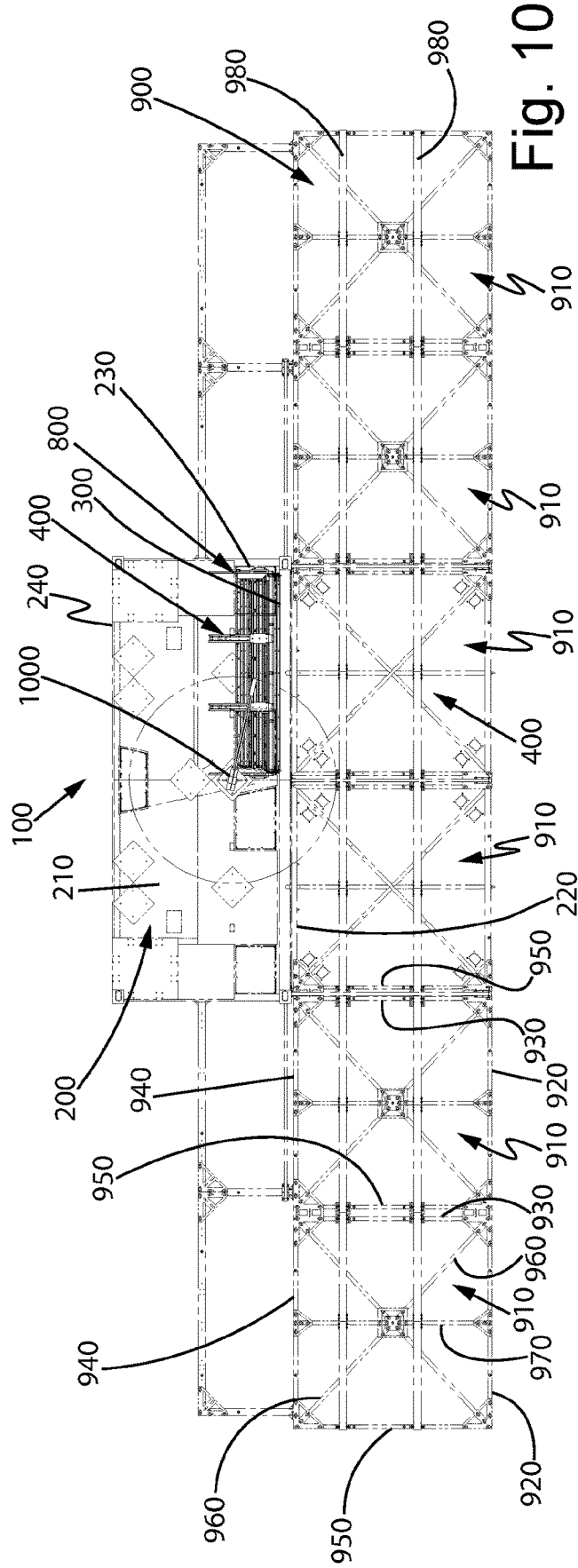

ENERGY STORAGE SYSTEM

The present invention refers to an energy storage.

In the state of the art, a renewable energy generated by photovoltaic or wind generators is stored by means of liquid hydrogen energy storages or through other heat transfer fluids. Compressed air energy storages adapted to store energy produced by renewable energy generators and storing a part thereof by compressing air and storing it inside an enormous cavity in the ground are known.

Disadvantageously, the storage of energy in compressed air requires a large volume and there are no energy storages that can be transported.

In the state-of-the-art photovoltaic plants are known comprising a plurality of photovoltaic panels and a support frame for said plurality of photovoltaic panels, in which the frame arranges the panels obliquely so as to form an acute angle with the soil.

Disadvantageously, the photovoltaic plant is difficult to transport and cannot be assembled and disassembled in a short time.

In the state-of-the-art wind power plants comprising rotors comprising rotating blades adapted to rotate with the wind, an electric wind turbine assembled with the rotor for generating electric current are known.

Disadvantageously, for a wind power plant to be assembled, large support pillars are required for wind turbine rotors which are difficult to transport and difficult to assemble and disassemble in a short time.

The object of the present invention consists in realising a compressed air energy storage which is transportable in a simple way and can be easily assembled.

According to the invention, such object is achieved with an energy storage according to claim 1.

A further object of the present invention consists in realising a transportable apparatus for generating and storing energy from renewable energy sources, which is easily transportable and is easy and quick to assemble and disassemble.

In accordance with the invention, this further object is achieved with a transportable energy generation and storage apparatus according to claim 11.

Other features are envisaged in the dependent claims.

The features and advantages of the present invention will be more apparent from the following description, which is to be understood as exemplifying and not limiting, with reference to the appended schematic drawings, wherein:

FIG. 1 is a front view of a renewable energy storage according to the present invention comprising a first container which in the figure is uncovered, wherein the first container comprises an inner space subdivided into three compartments, two lateral and one central, each of the two side compartments comprises a containment cage, two plurality of pressure vessels for compressed air stacked respectively inside each of the containment cages of the two side compartments of the first container, a tank containing heat transfer fluid lying on a bottom of a central compartment of the first container, a compressor for compressing air comprising an electric motor powered by at least one renewable energy generator, wherein the electric motor comprises a radiator, a compressor outlet duct for the compressed air of the compressor, in which the compressor outlet duct comprises a heat exchanger adapted to exchange heat between the compressed air and the heat transfer fluid contained in the tank, a plurality of pneumatic ducts for compressed air connected to said compressor, said plurality of pneumatic ducts comprising a plurality of heat exchangers adapted to enable a heat exchange between compressed air and heat transfer fluid contained in the tank, the plurality of pneumatic ducts are connected to the two plurality of pressure vessels, an electric turbine connected by means of a plurality of pneumatic ducts to the two plurality of pressure vessels which supply compressed air for rotating the electric turbine such that it can generate electric current, the electric turbine comprising an electric generator, the first container comprises a chimney arranged above the compressor;

Figure 5:
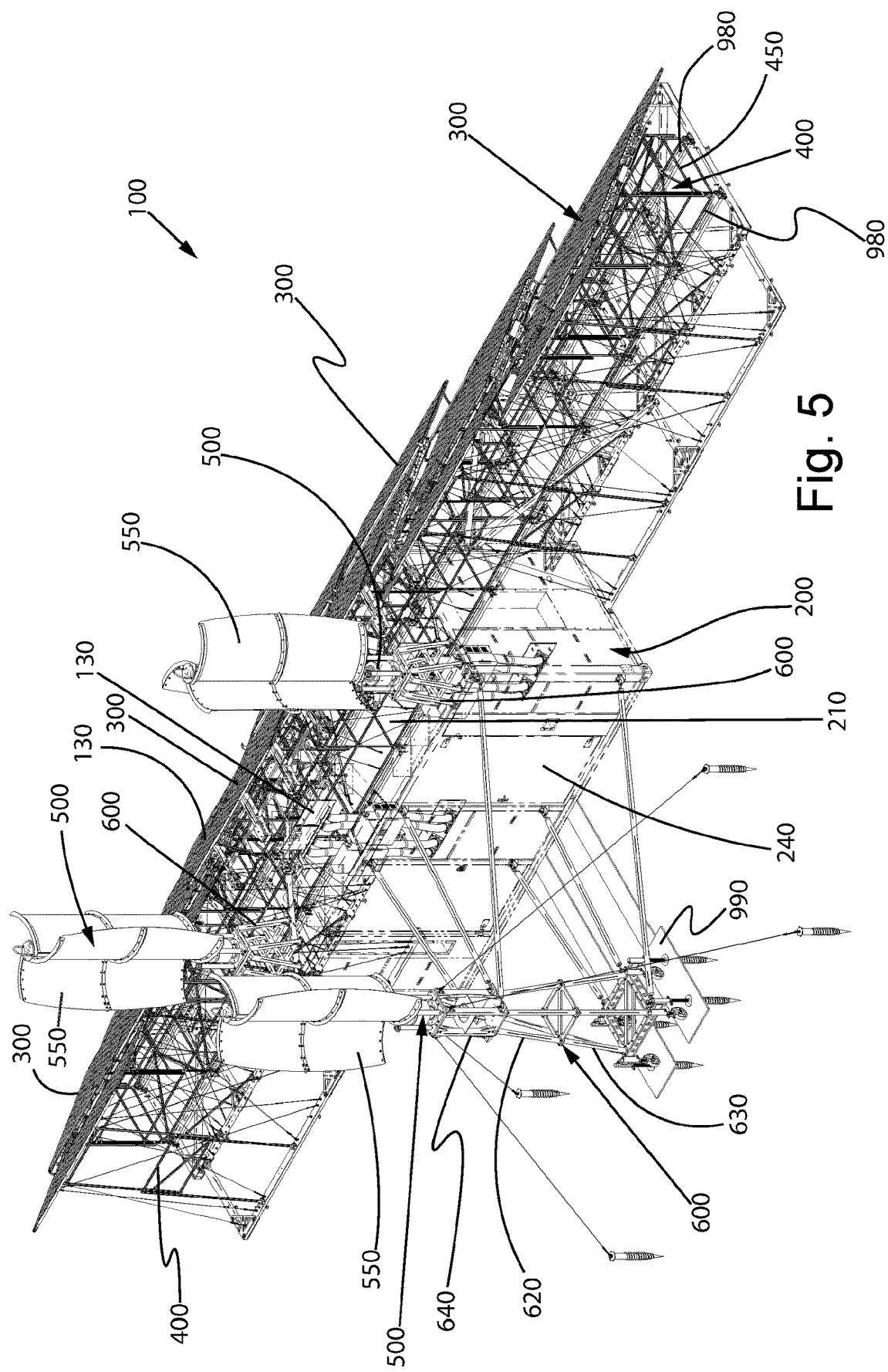
Figure 6:
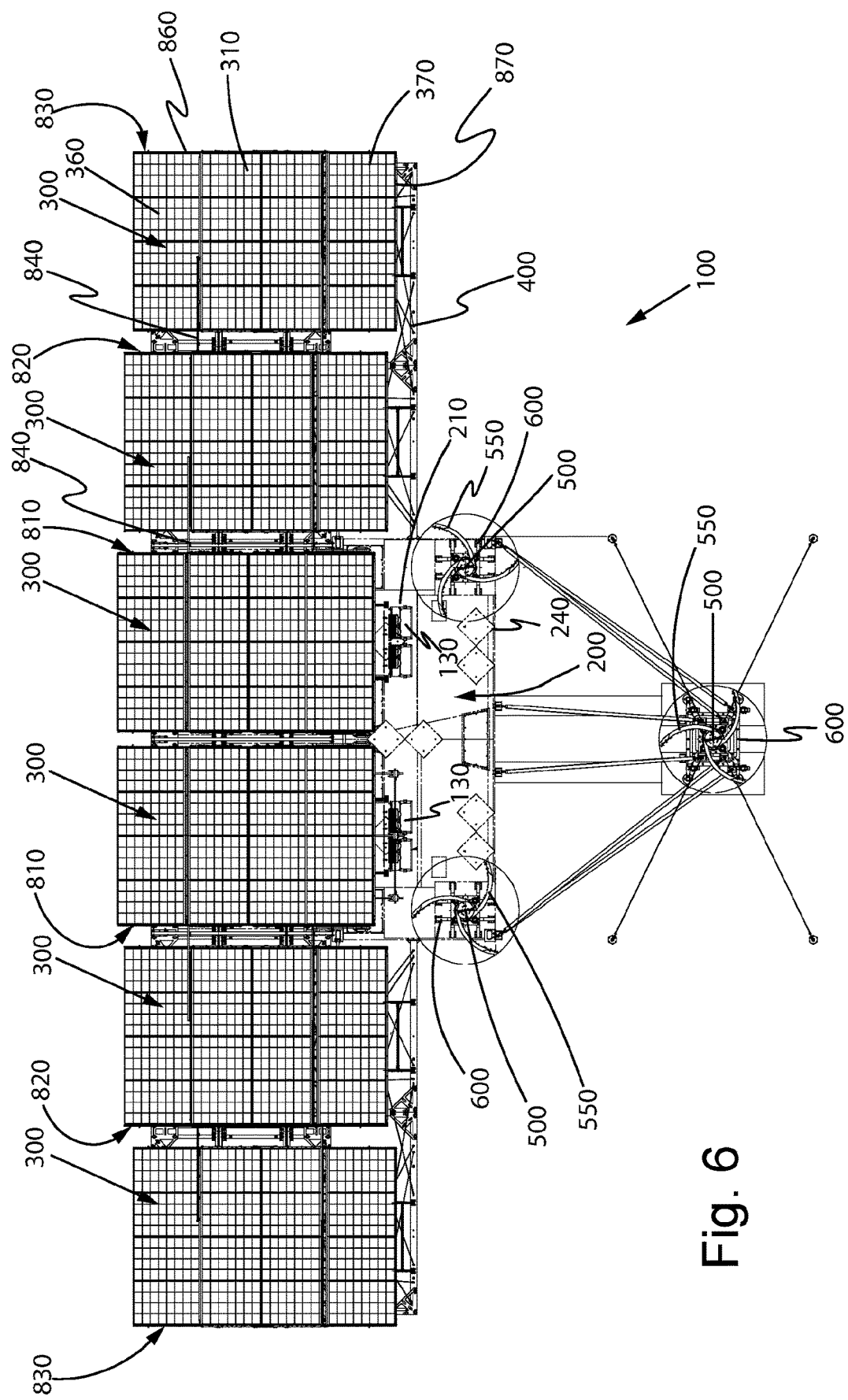
Figure 7:
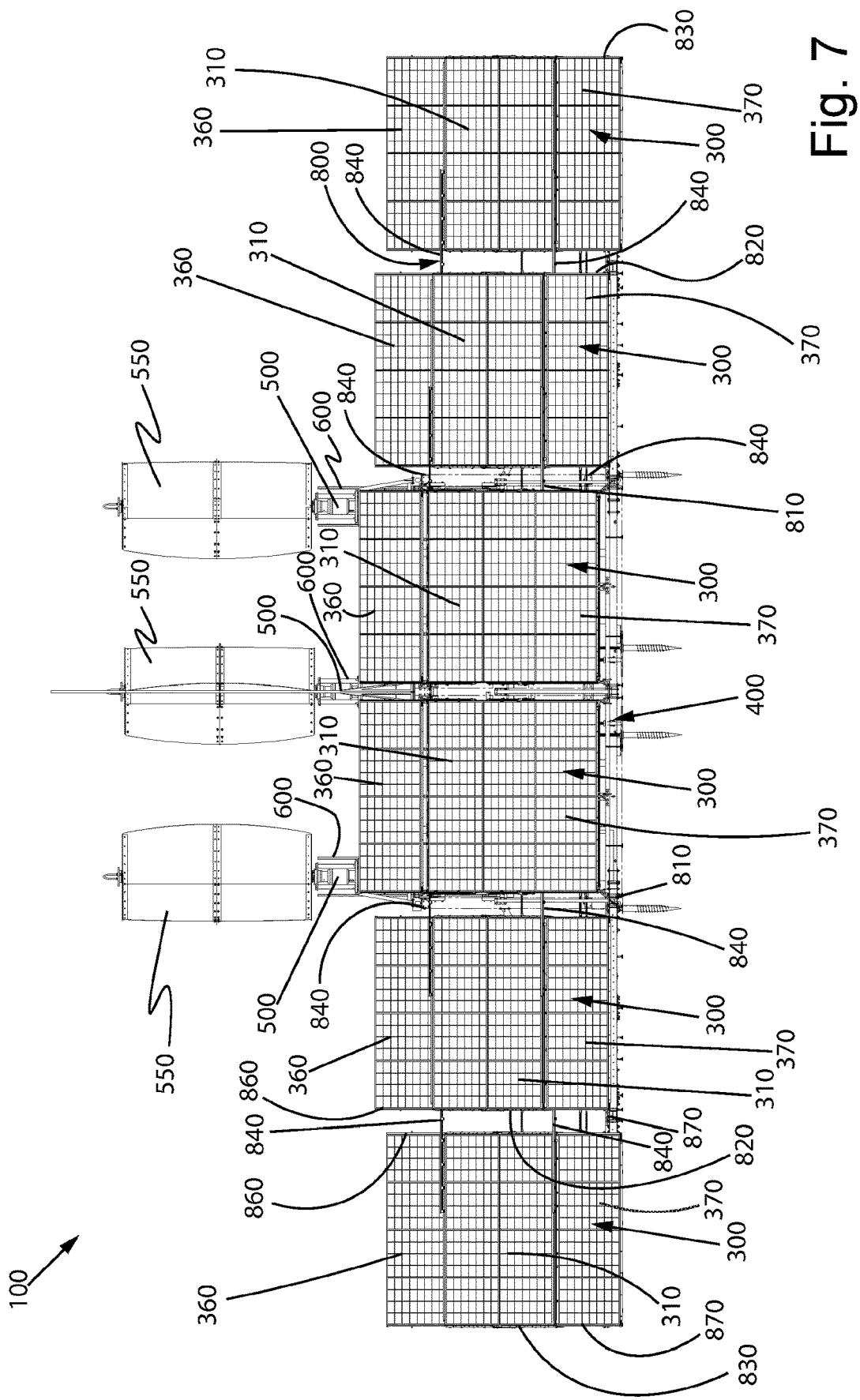
Figure 8:
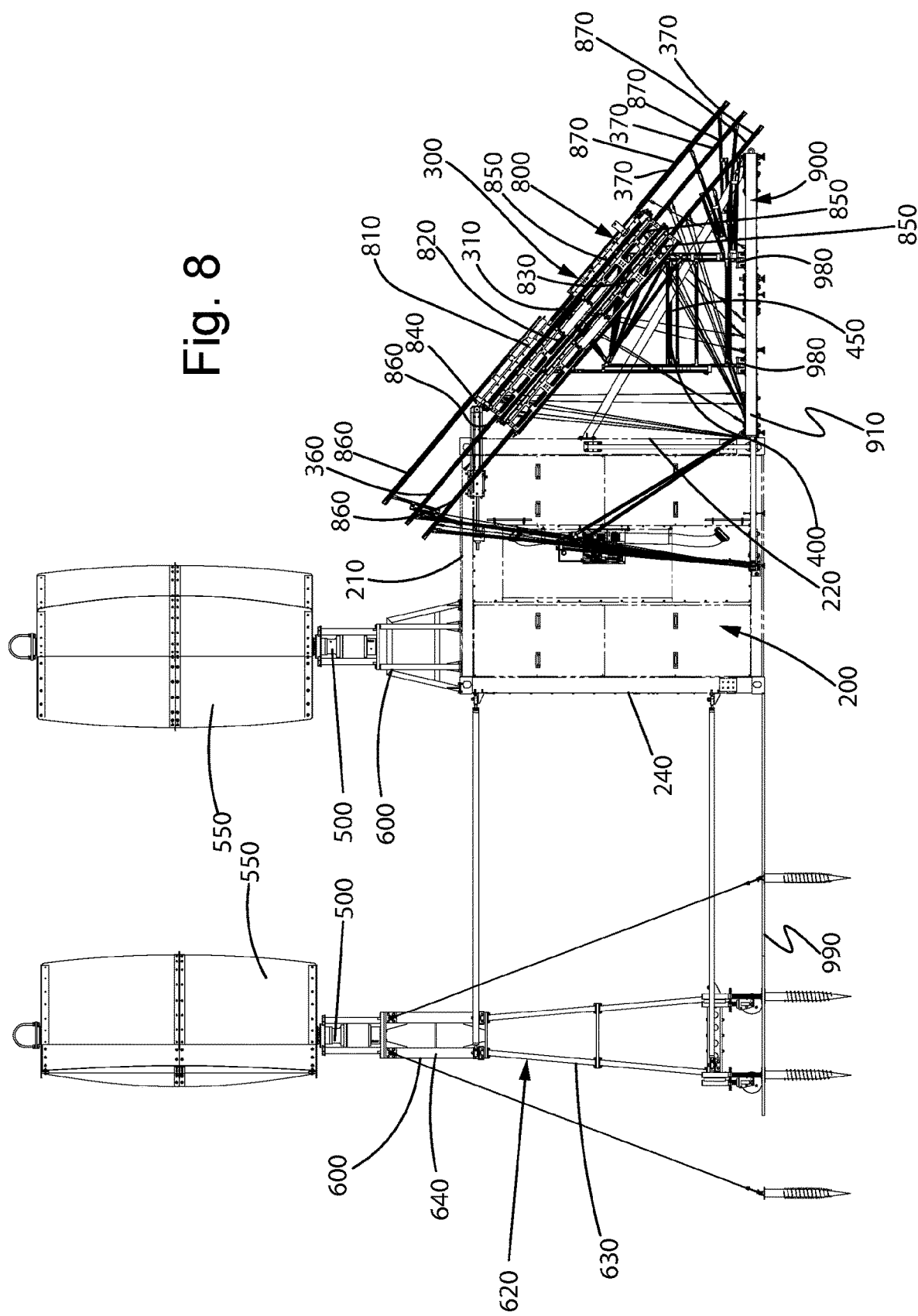
Figure 11:
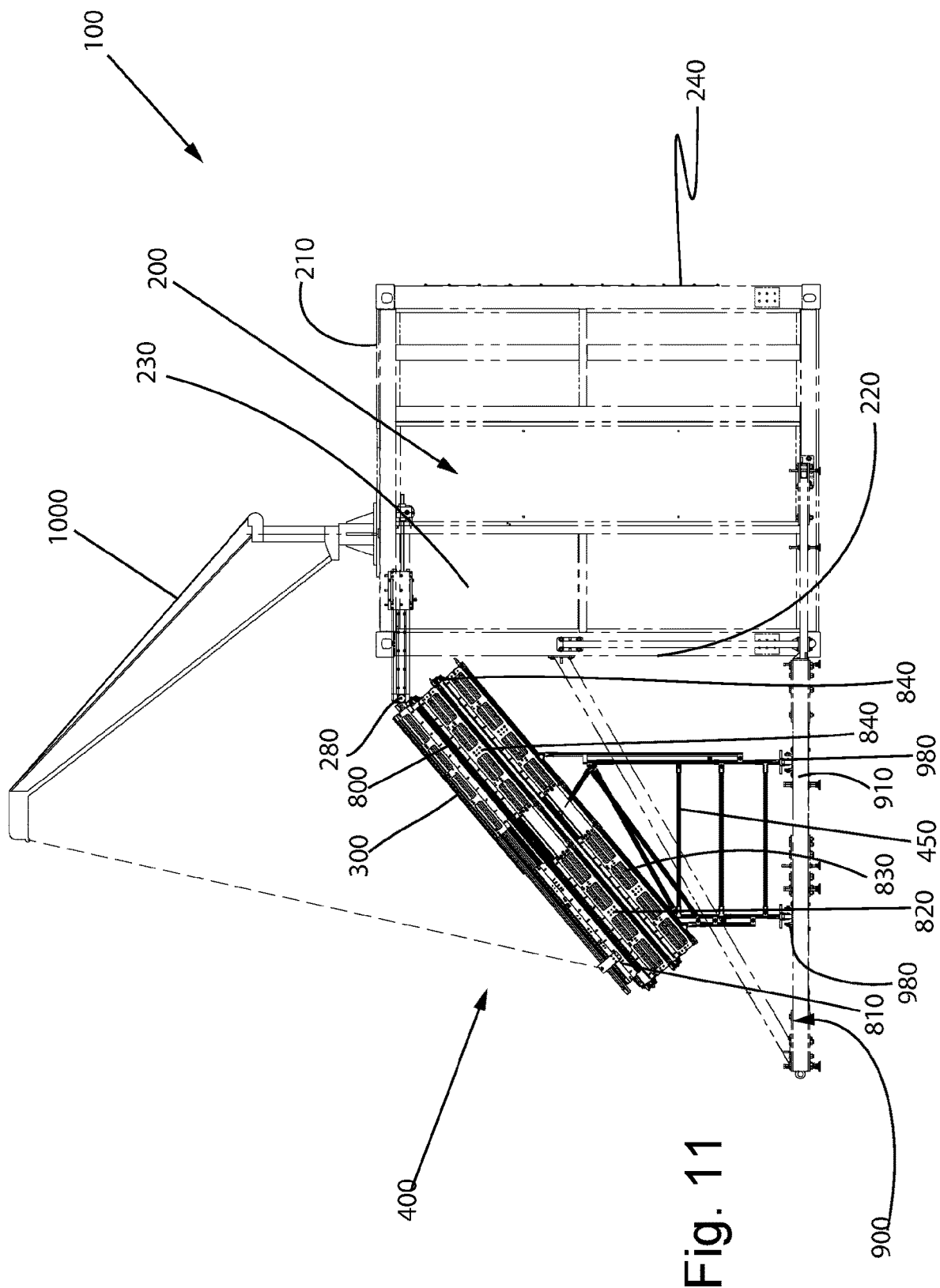
Figure 12:
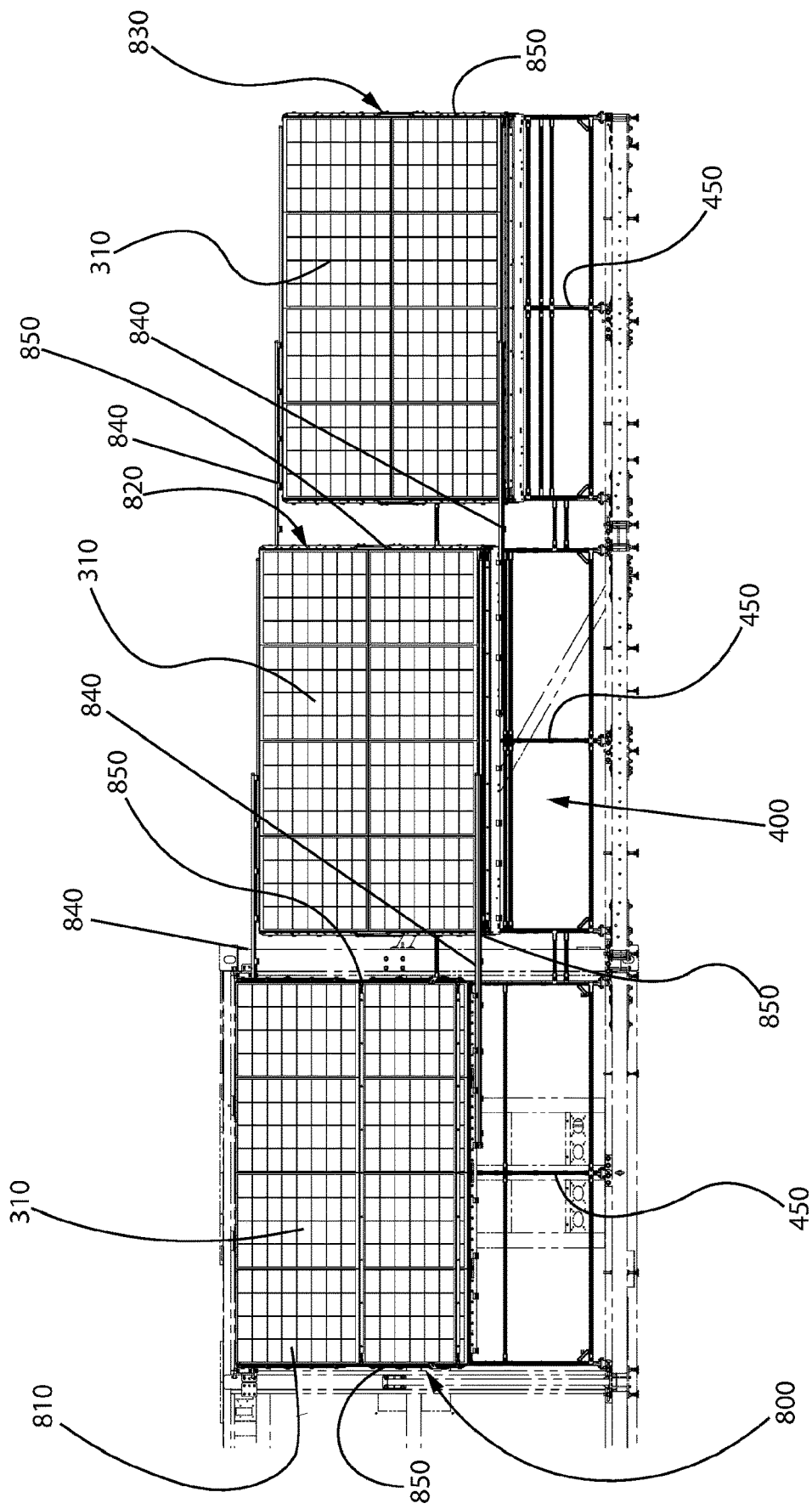
Figure 13:
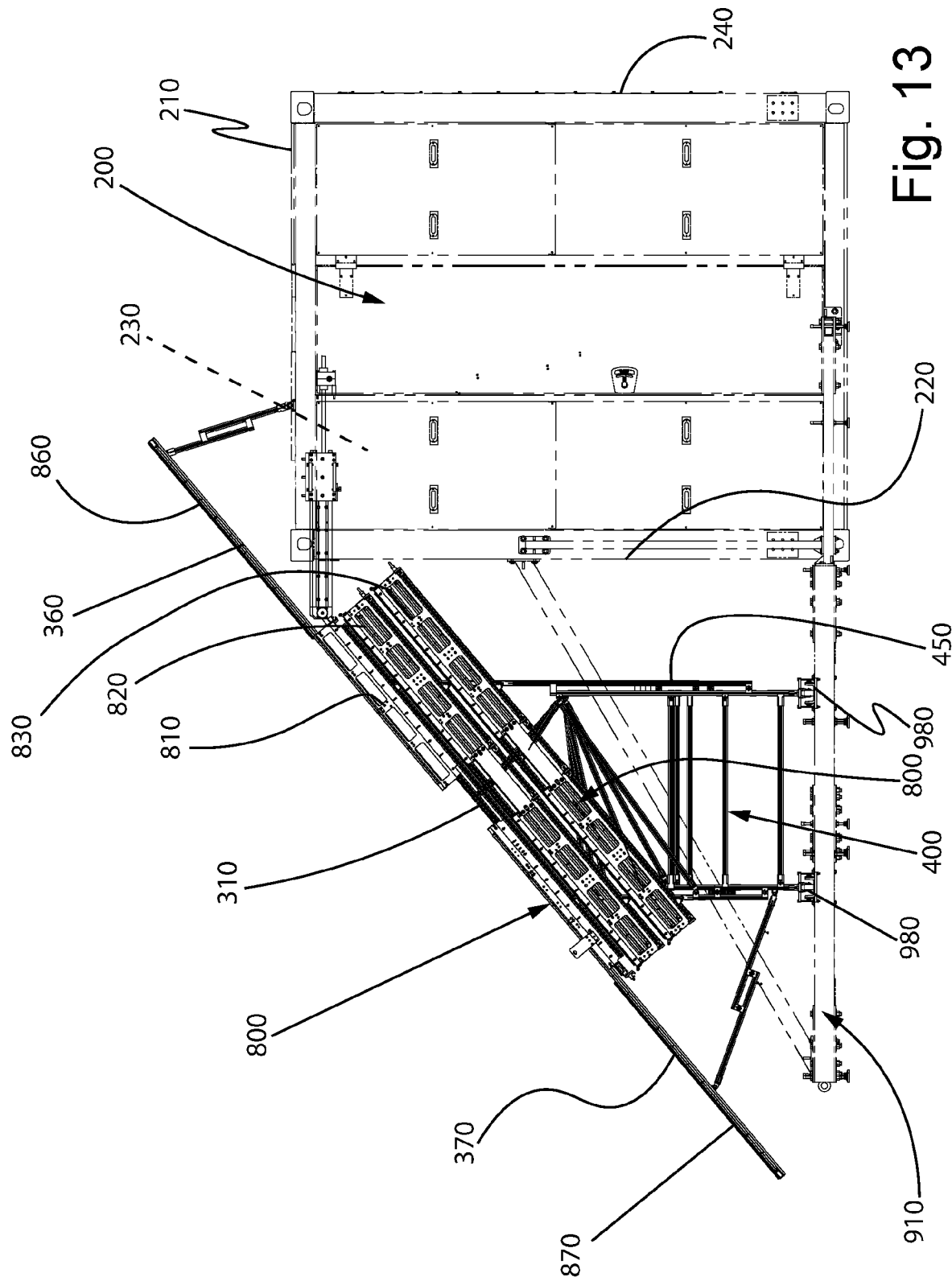
Figure 14:
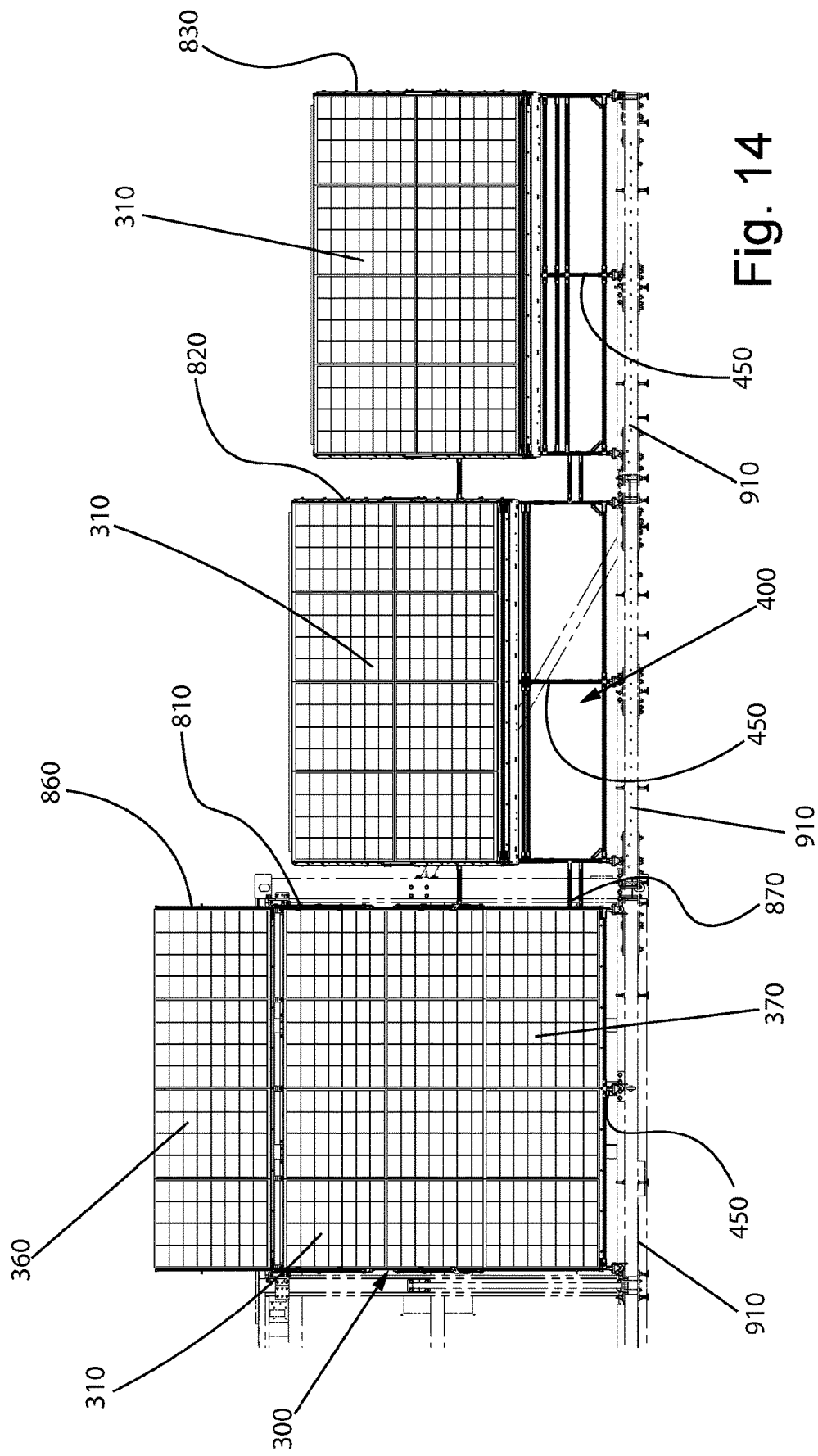
Figure 15:
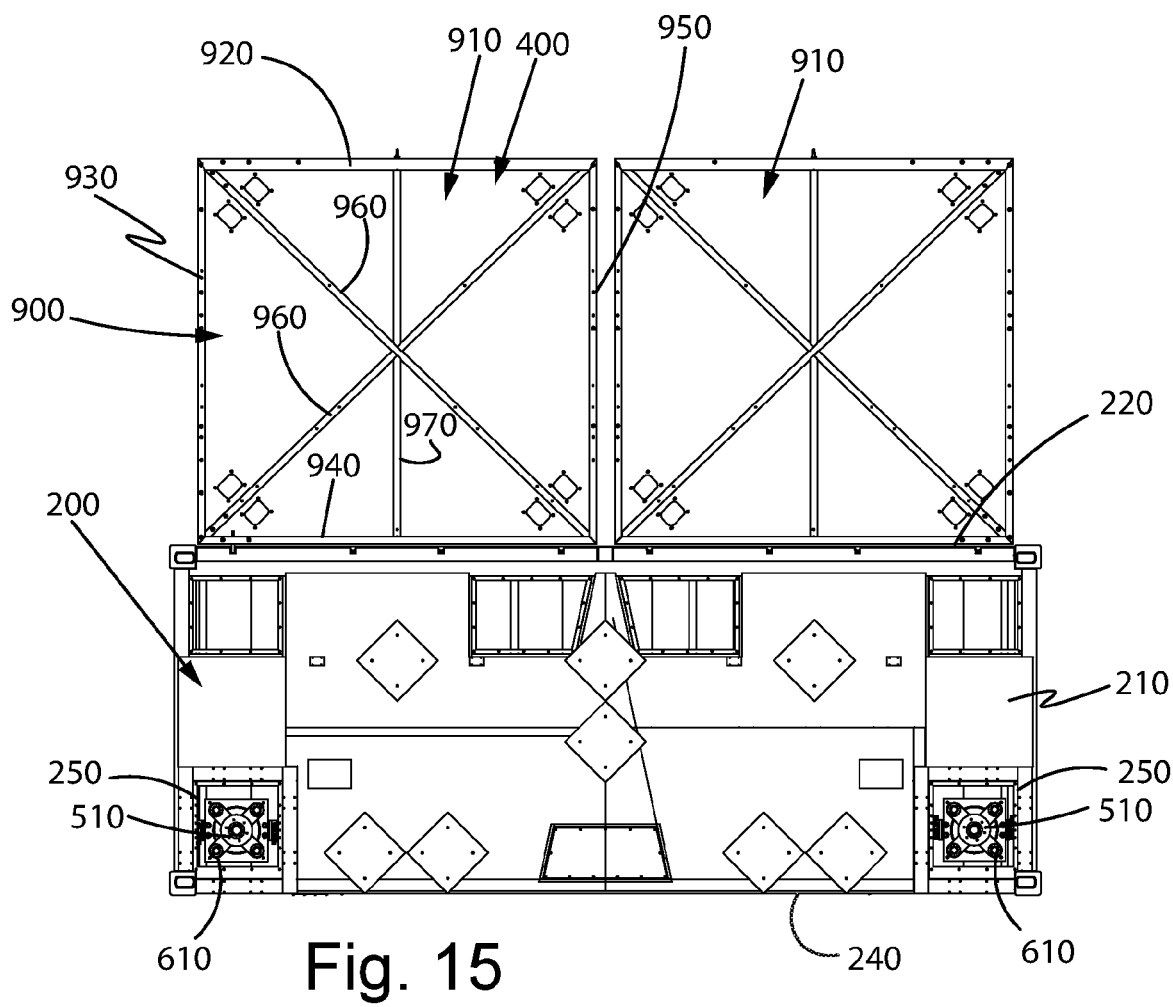
Figure 16:
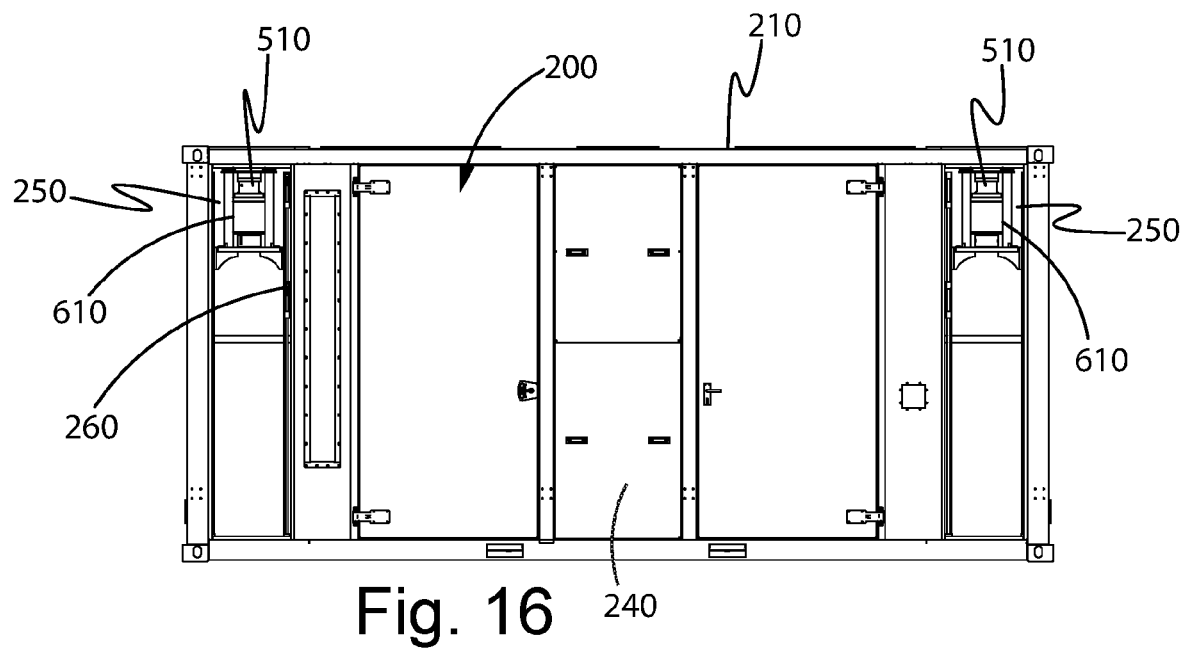
Figure 17:
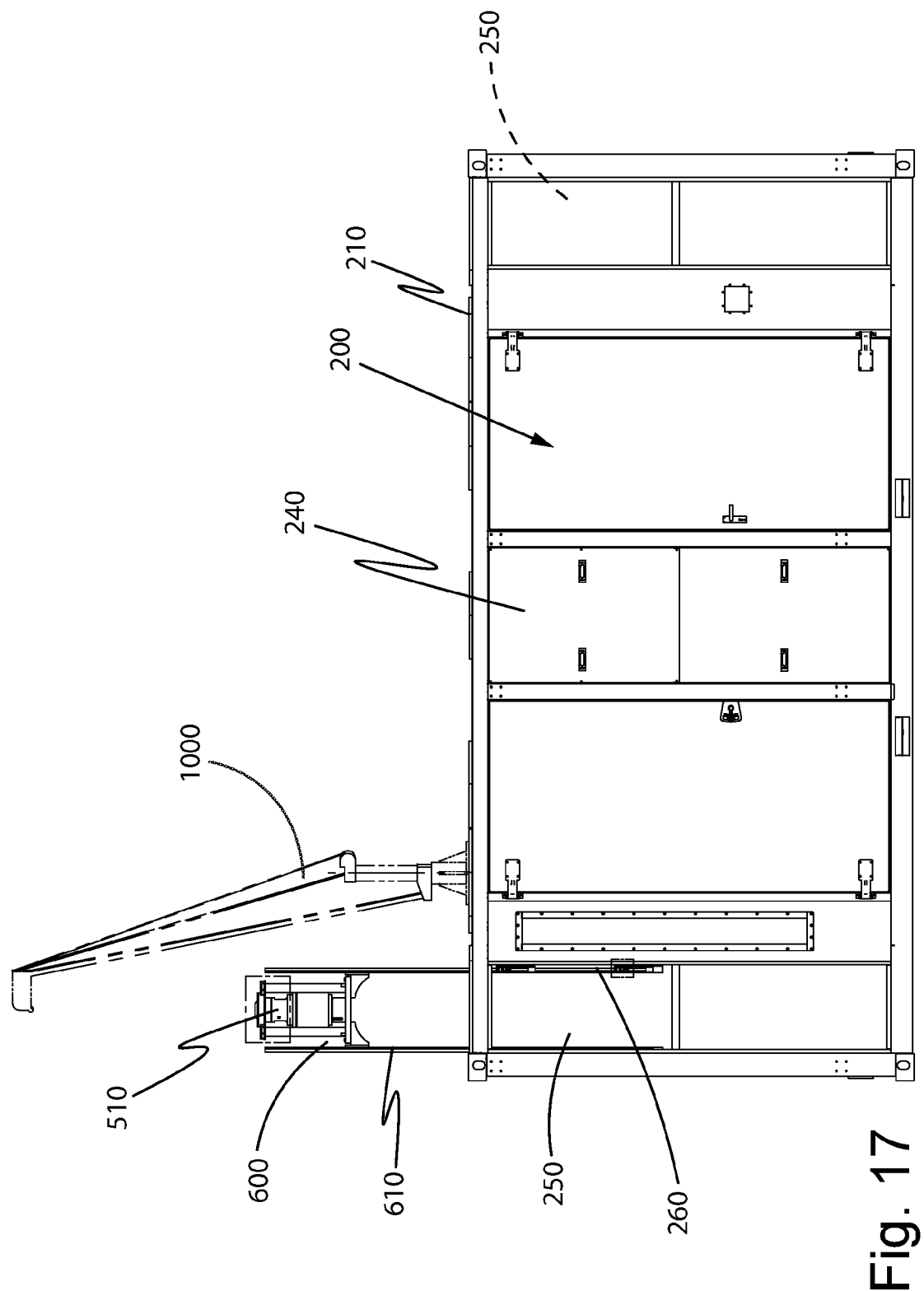
Figure 18:
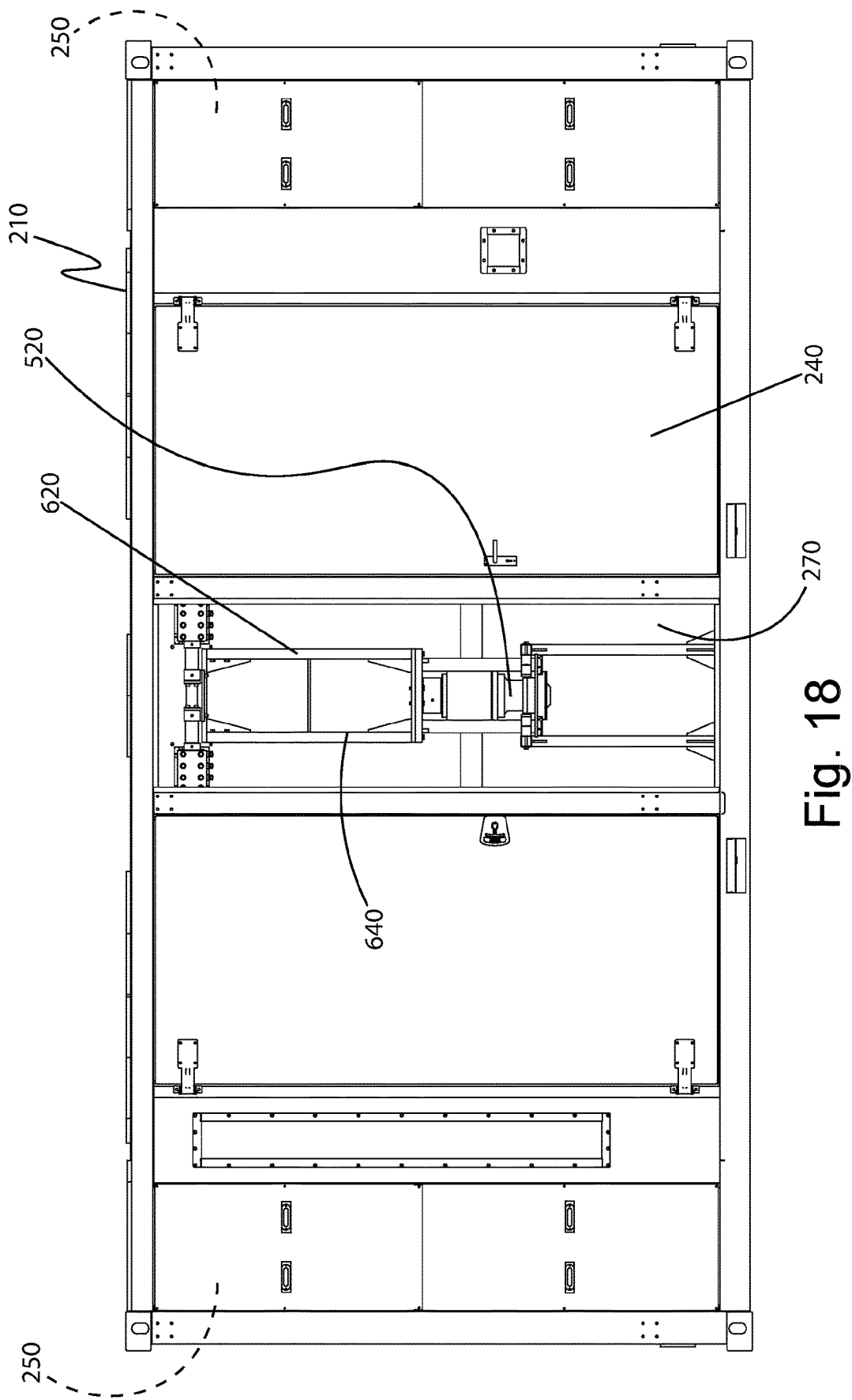
Figure 19:
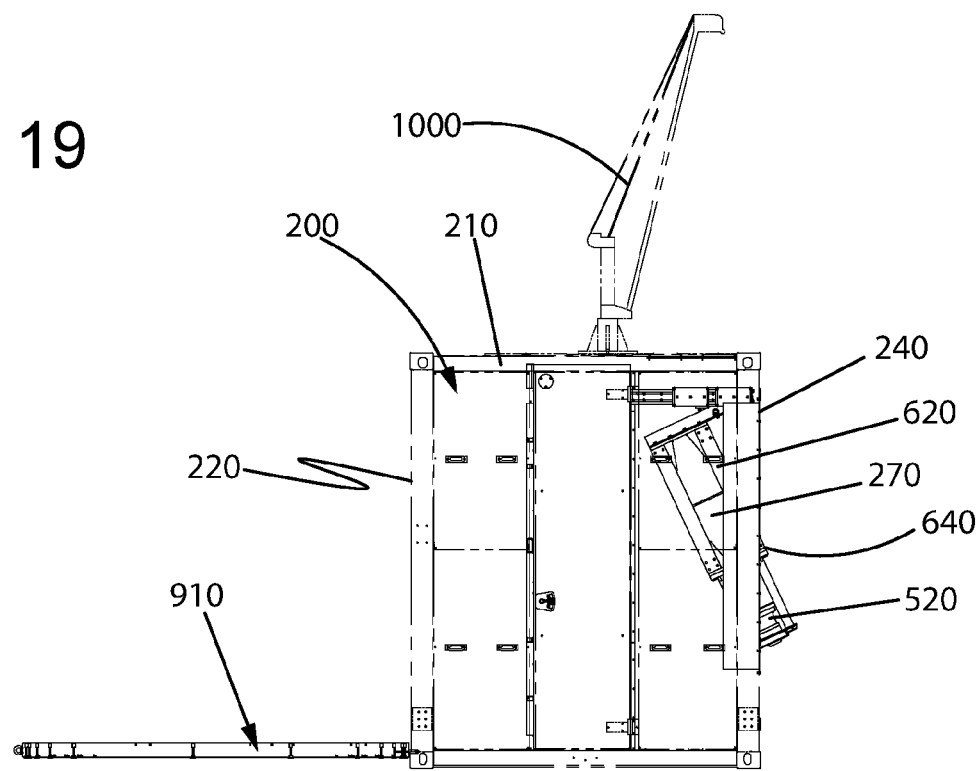
Figure 20:
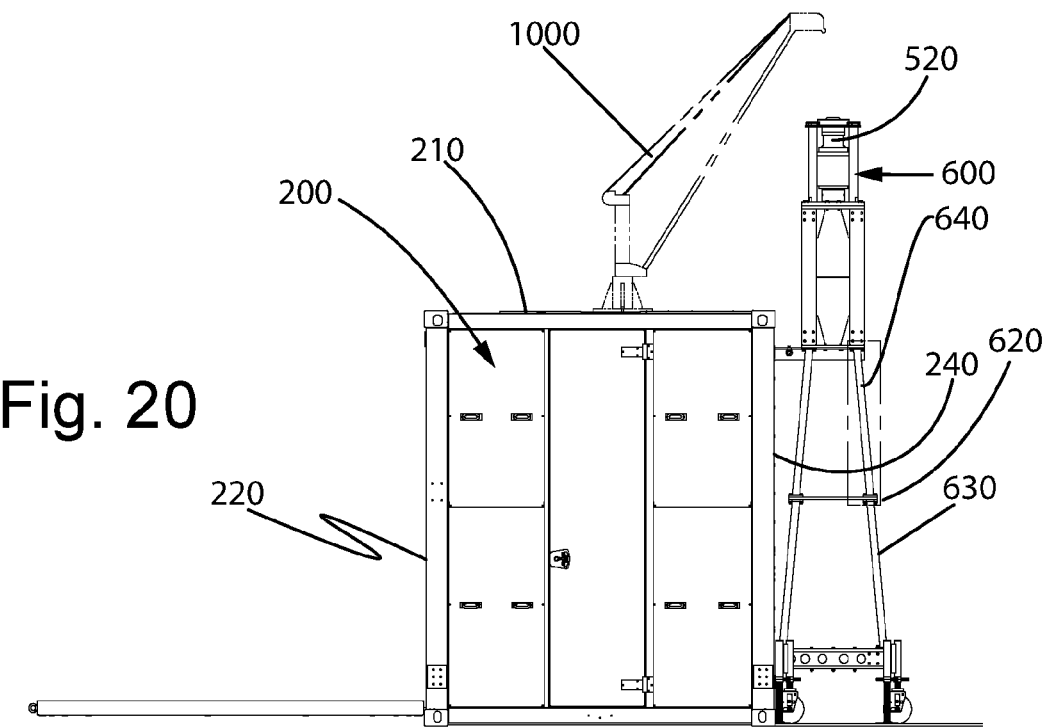
Figure 21:
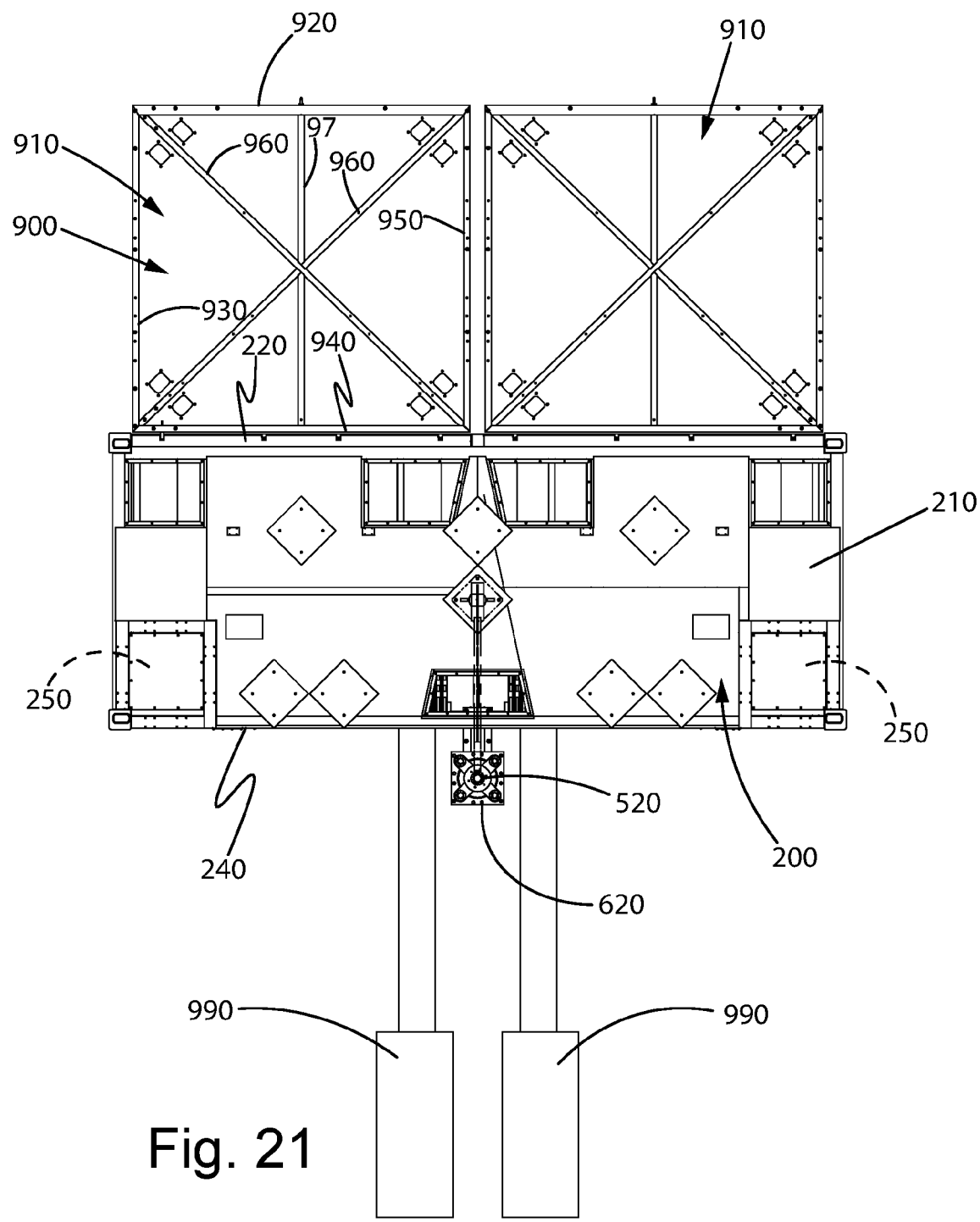

FIG. 5 is a rear perspective view of a generator of electricity from renewable energy sources which cooperates with the energy storage of FIGS. 1-4 to form a transportable energy generation and storage apparatus, wherein the electricity generator comprises a second container, a plurality of photovoltaic panels, a foldable support frame which provides the plurality of photovoltaic panels and is assembled with the second container, three wind turbines comprising wind blades, three support frames for the three wind turbines, at least one electric current inverter assembled with the second container;

FIG. 6 is a top plan view of the power generator;

FIG. 7 is a front view of the power generator;

FIG. 8 is a side view of the power generator;

FIG. 9 is a front view of the second container during a first step of construction of a foldable support frame half for the plurality of photovoltaic panels that are folded inside the second container;

FIG. 10 shows a top plan view of the second container of FIG. 9;

FIG. 11 shows a side view of a second step of construction of the half of the support frame in which the plurality of folded photovoltaic panels is extracted from the second container through a rotation that brings a support plane for the photovoltaic panels of the support frame into a position inclined with respect to the ground;

FIG. 12 shows a front view of a third step of construction of the half of the support frame in which three portions of the support frame for the photovoltaic panels are made to slide the one with respect to the other by unfolding three support frame modules;

FIG. 13 shows a side view of a fourth step of construction of the half of the support frame in which a first module of the support frame makes two portions of the support plane for the photovoltaic panel slide upwards and downwards, respectively in order to unfold the photovoltaic panels assembled on the first module of the support frame;

FIG. 14 shows a front view of the fourth construction step of FIG. 13;

FIG. 15 shows a top plan view of the second container partially uncovered during a first step of assembly of the side support frames for side wind turbines, wherein the second container comprising two side housings, each of which houses a side support frame for a side wind turbine;

FIG. 16 shows a side view of FIG. 15;

FIG. 17 shows a side view of the second container partially uncovered showing one of the side support frames for the side wind turbine extracted by sliding from the second container and in operating position;

FIG. 18 shows a front view of the second container partially uncovered during a first step of assembly of a central support frame for a central wind turbine, in which the central support frame is housed inside a central housing of the second container;

FIG. 19 shows a side view of the second partially uncovered container of FIG. 18 during a second step of assembly of the central support frame, in which the central support frame is extracted from the housing by rotating it around an upper axis of rotation;

FIG. 20 shows a side view of the second partially uncovered container of FIGS. 18 and 19 during a third step of assembly of the central support frame, in which the central support frame is completely extracted in position and is supported by a lower support frame comprising wheels;

FIG. 21 shows a top plan view of FIG. 20 in which there is a structure for resting the lower support frame.

With reference to the aforementioned figures, a transportable energy generation and storage apparatus is shown comprising an energy storage 10 and at least one generator of energy 100 from renewable energy sources.

The energy accumulator 10 comprises a first container 20 comprising an inner space subdivided into three compartments, two lateral 21 and one central 22.

Each of the two side compartments 21 comprises a containment cage 50. The energy storage 10 comprises two plurality of pressure vessels 40 for compressed air which are stacked respectively inside each of the containment cages 50 of the two side compartments 21 of the first container 20. The energy storage 10 comprises a tank 30 containing a heat transfer fluid. The tank 30 rests on a bottom of a central compartment 22 of the first container 20. The energy storage 10 comprises a compressor 60 for compressing air comprising an electric motor powered by at least one of said renewable energy generator 100 shown in FIGS. 5-21, a plurality of pneumatic ducts 70 for compressed air connected to said compressor 60, wherein the plurality of pneumatic ducts 70 comprises a plurality of heat exchangers 73 adapted to enable a heat exchange between compressed air and heat fluid contained in the tank 30, wherein the plurality of pneumatic ducts 70 are connected to the two plurality of pressure tanks 40. The energy storage 10 comprises an electric turbine 80 connected in flow communication by means of the plurality of pneumatic ducts 70 to the two plurality of pressure vessels 40 which supply compressed air to rotate the electric turbine 80 such that it can generate electric current.

The energy storage 10 is an off-grid system that enables a rapid electrification of areas not connected to an electrical network such as rural, mountain areas or territories affected by natural or other calamities. The energy storage 10 is contained in the first container 20 which comprises ISO standard sizes for first commercial intermodal containers of parallelepiped shape and comprises a length of 20 feet high cube, i.e. 606 cm, a height of 9 feet and 6 inches, i.e. 290 cm, and a width of 8 feet, i.e. 244 cm. The energy storage 10 advantageously allows maximising the use of energy from renewable sources, such as photovoltaic or wind electric generators, which by nature do not generate electricity constantly over time but depend on solar lighting and power wind, by using a pneumatic storage system that releases energy when there is an actual need from the utilities connected with the energy storage 10.

The energy storage 10 further comprises a process which can be implemented electronically through a software for electronic computer comprising at least one memory and at least one processor, wherein the process controls the energy storage 10 for storing renewable energy from said at least one renewable energy generator 100 and to supply the electricity in time of need to the utilities connected with the energy storage 10.

The electronic computer also comprises sensors that measure the electric current delivered during the operation of the turbine and which measure the pressure of the compressed air contained in the two plurality of pressure vessels 40 and the temperature of the heat transfer fluid contained in the tank 30. These measures allow a computer program implemented in the memory of the electronic computer to control the energy storage 10 based on the needs of external utilities and based on the energy stored by the energy storage 10.

Advantageously, the energy storage 10 can be installed and assembled rapidly and quickly and is easily transportable anywhere on the planet.

Advantageously, the dimensions of the first container 20 allow an easy transportation of the energy storage 10 both by road by means of a truck of a freight train and by water by means of cargo ships.

The two side compartments 21 of the first container 20 are separated from the central compartment 22 by means of vertical structures 23 which rise from a bottom of the first container 20.

Each containment cage 50 is adapted to create a space inside the respective side compartment 21 inside which to stack the plurality of pressure vessels 40.

Each pressure vessel 40 comprises dimensions of a commercial cylinder for containing compressed air, i.e. it comprises a cylindrical portion which comprises a cross section in the shape of a geometric circle. The cylindrical portion of each pressure vessel 40 comprises an axis of symmetry which is arranged parallel to a width of the first container 20 so as to advantageously promote the transportation and stacking of the tanks 40 the one over the other in a row.

Figure 1:
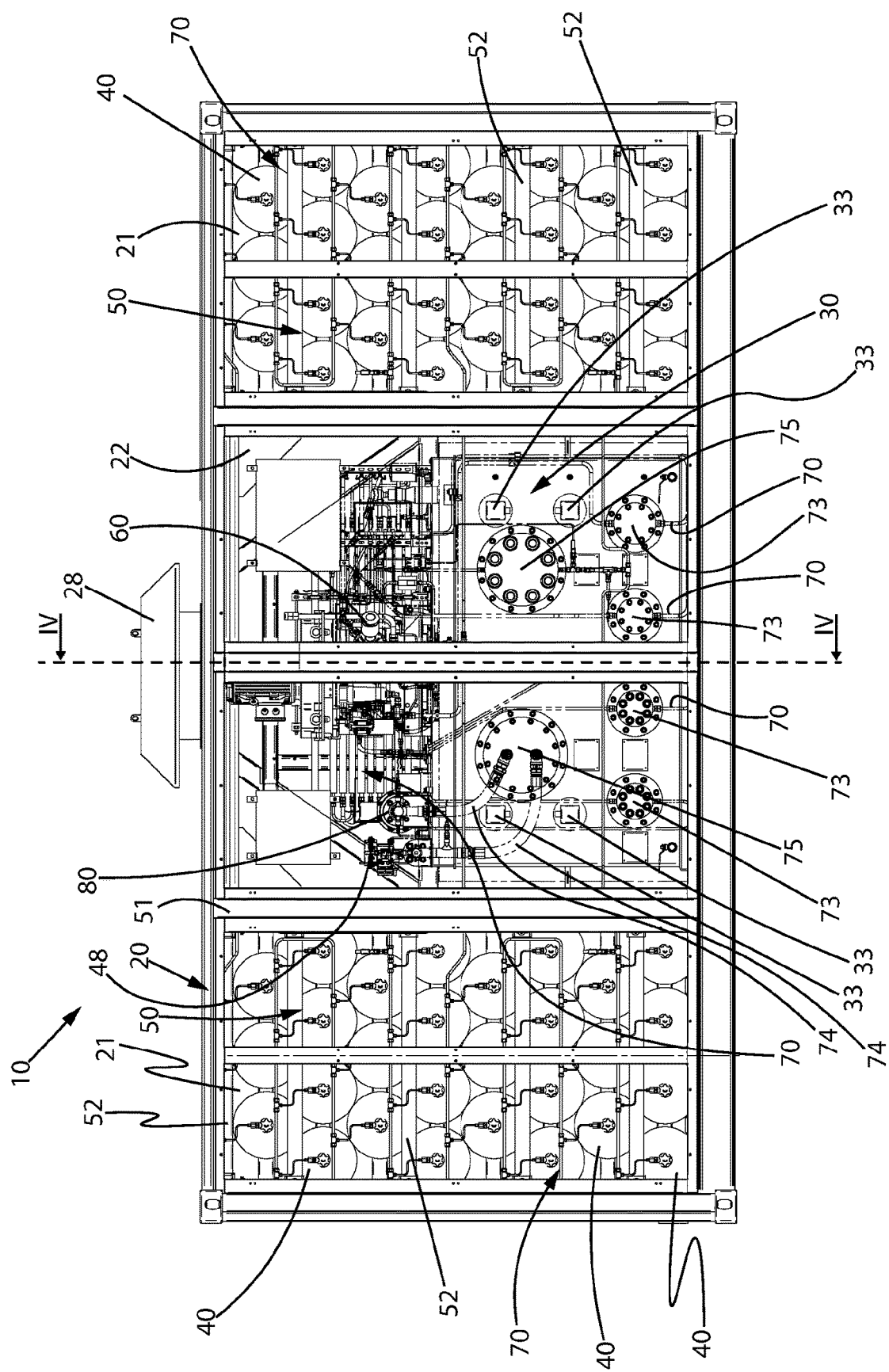
Figure 2:
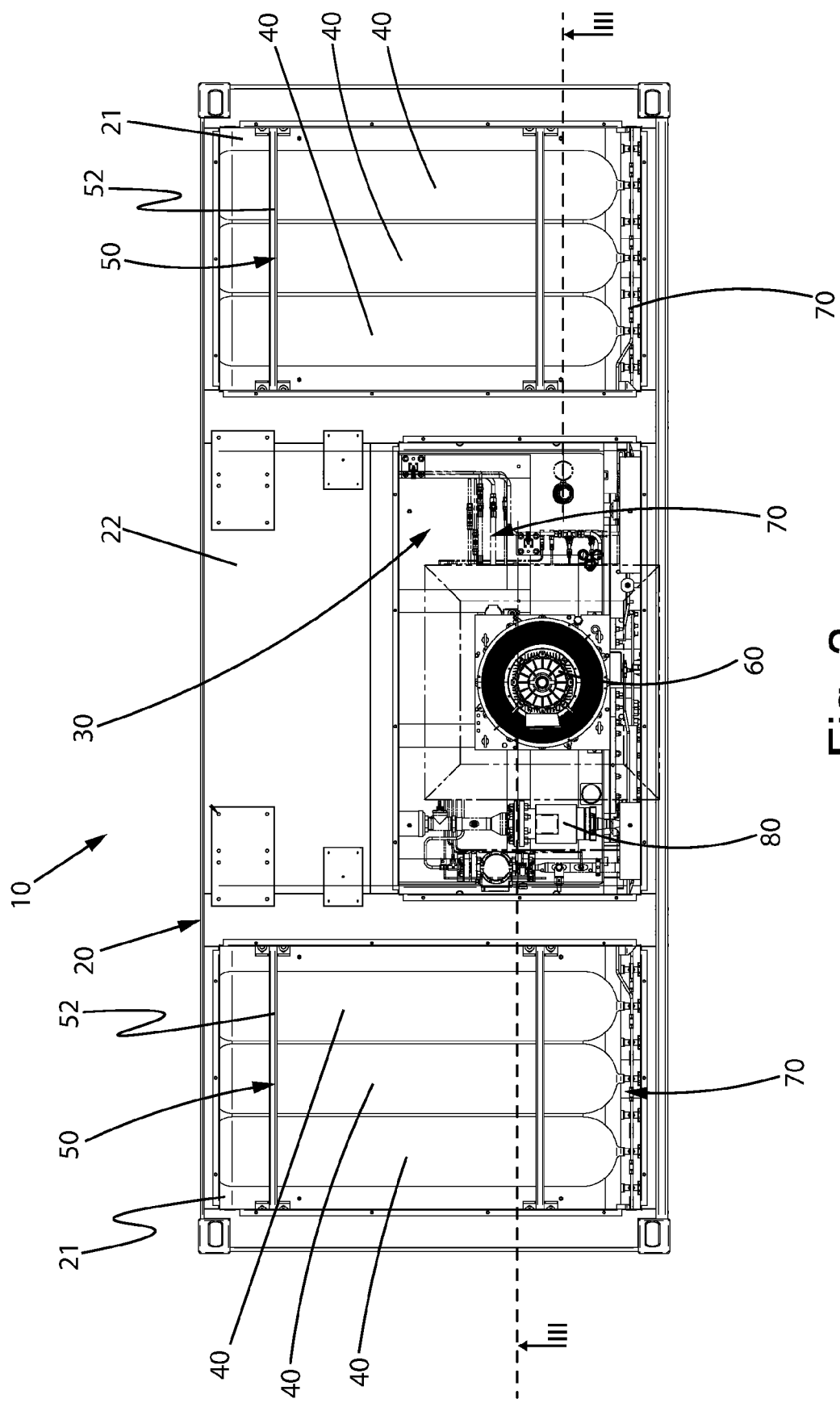
FIG. 2 is a top view of the energy storage of FIG. 1 with the first container uncovered.
Figure 3:
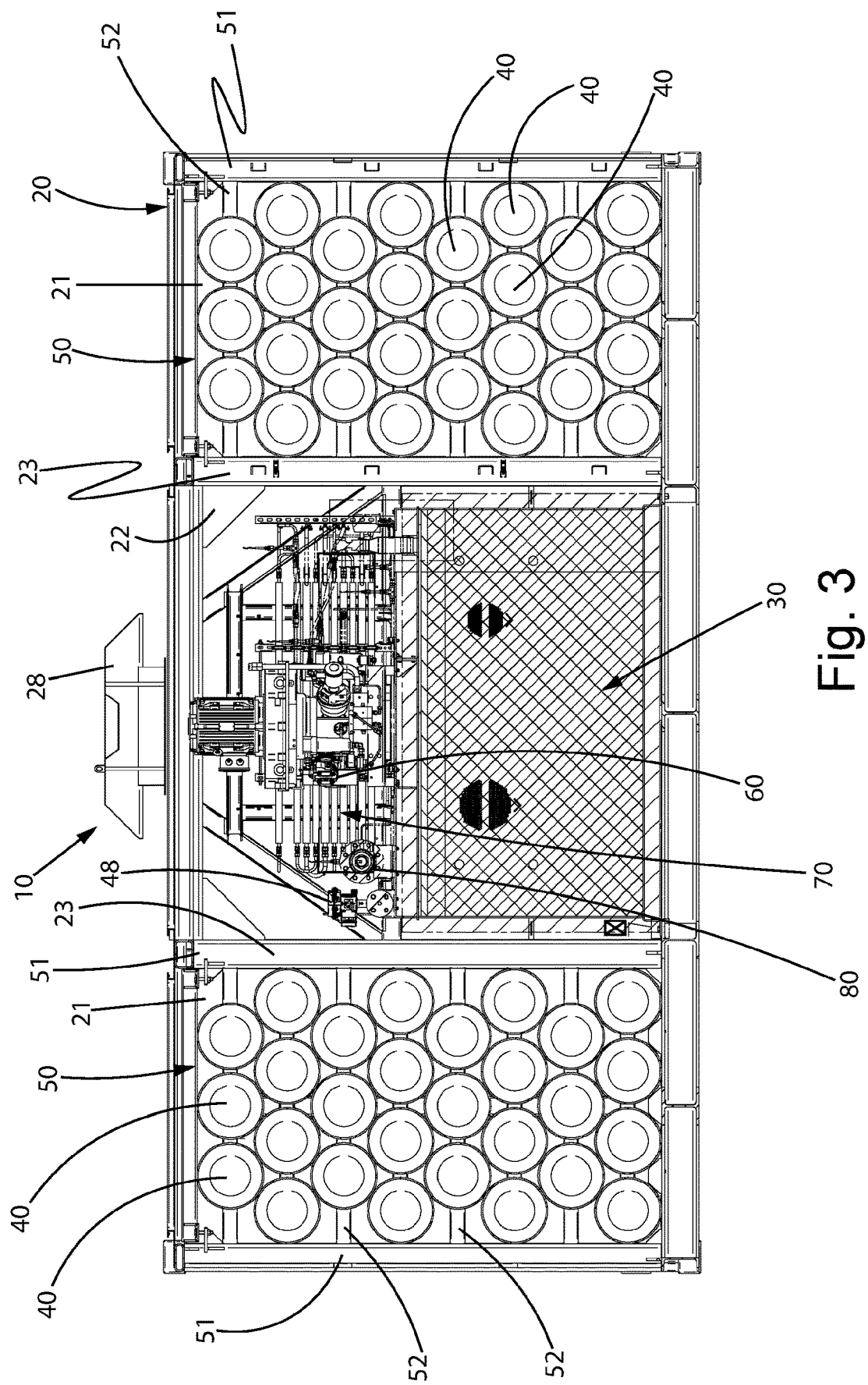
FIG. 3 is a sectional view along the line III-III in FIG. 2.
Figure 4:
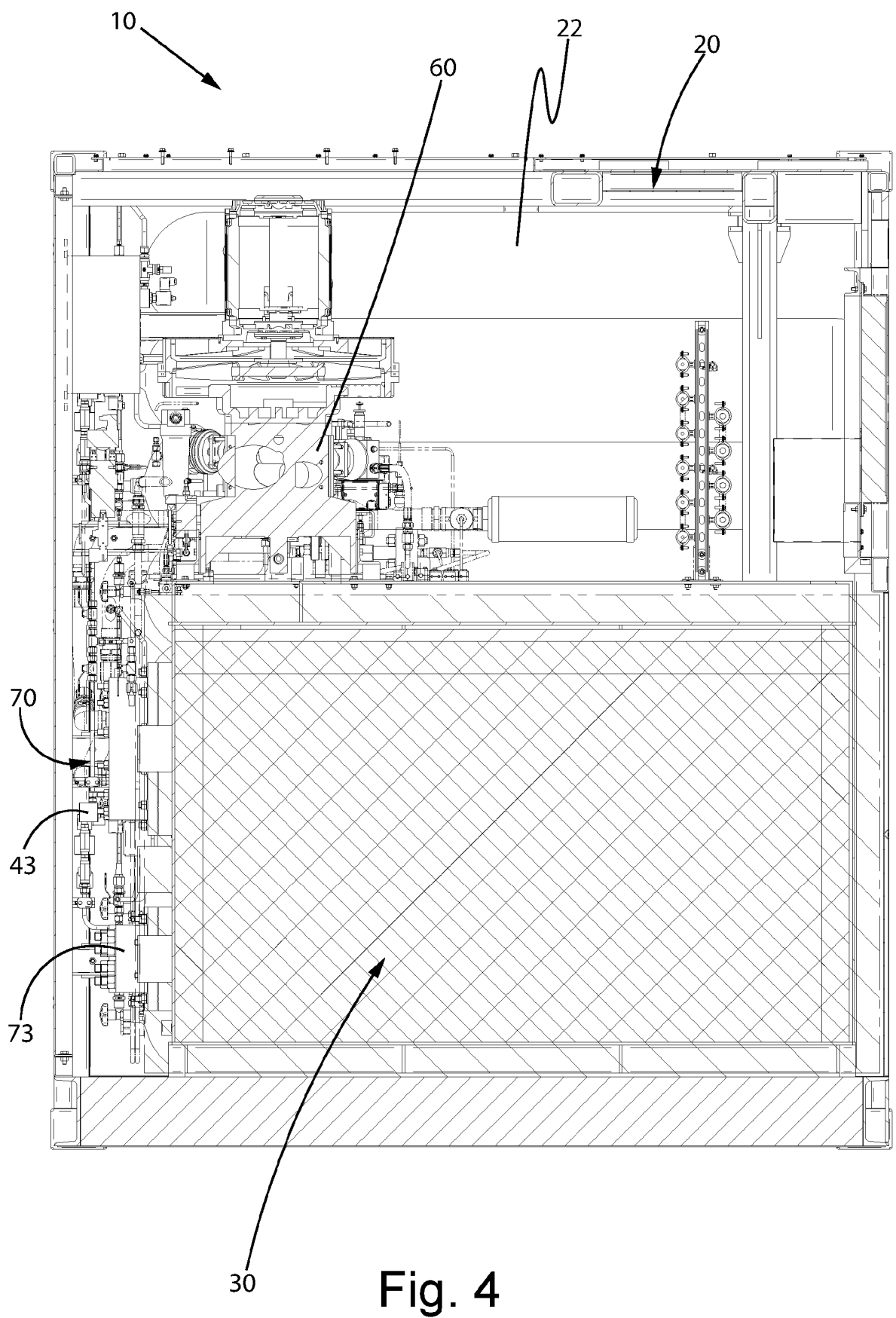
FIG. 4 is a sectional view along the line IV-IV in FIG. 1.

The two plurality of tanks 40 are stacked inside the two respective containment cages 50 by resting the bottom of the cylindrical wall towards the bottom of the first container 20 the one next to the other in rows and being stacked the one over the other to effectively occupy the entire space inside the containment cage 50 of the respective side compartment 21. As shown in FIGS. 1 and 3 the plurality of pressure vessels 40 are arranged in rows stacked one over the other such that the pressure vessels 40 arranged on the bottom support the row of pressure vessels 40 which is arranged above, wherein each pressure vessel 40 of the row arranged above is arranged in a space between one tank 40 and the other of the row of tanks 40 arranged below. In particular in FIGS. 1 and 3 it is shown that a row of tanks 40 on the bottom of the containment cage 50 of the side compartment 21 comprises a row of four tanks 40, the row above comprises three tanks 40, the one above a row of four tanks 40 and so on until the entire space of the containment cage 50 of the side compartment 21 is filled in height. This arrangement of the tanks 40 inside the containment cage 50 advantageously allows all the space available inside the side compartment 21 to be filled with greater efficiency, making sure that the tanks 40 remain rigidly interlocked with each other.

The two plurality of pressure vessels 40 shown in the figures comprise two volumes which altogether contain about 10 cubic meters of compressed air.

Advantageously, for reasons of transportation and weight balance, the two plurality of tanks 40 have been subdivided into the two side compartments 21.

Advantageously, to prevent the plurality of stacked pressure vessels 40 from being able to move the one with respect to the other, they are inserted inside the respective containment cage 50 of the respective side compartment 21 of the first container 20.

The containment cage 50 comprises a metal structure comprising vertical 51 and horizontal 52 bars adapted to contain and keep firmly in position the pressure vessels 40 stacked inside the respective containment cage 50.

Advantageously, the two containment cages 50 of the two side compartments 21 of the first container 20 comprise a respective plurality of pressure vessels 40, subdividing the compressed air into a plurality of pressure vessels 40 for reasons of reliability and transportation safety.

For reasons of a safe transportation of compressed air, it was decided not to use a single pressure vessel comprising volumetric dimensions corresponding to the volume of the side compartment 21, but to subdivide the compressed air into a plurality of pressure vessels 40.

For safety and functional reasons each pressure vessel 40 comprises a solenoid valve 43 connected to the plurality of pneumatic ducts 70.

Furthermore, the plurality of pressure vessels 40 advantageously allows any one of the pressure vessels 40 to be replaced in a simple way.

Advantageously, the plurality of pressure vessels 40 also allows to enable a more functional modularity of the first container 20 allowing to more first containers 20 to be connected together and to operate together with a plurality of first container 20, such that a plurality of energy storages 10 can operate electrically connected in series or in parallel.

The first container 20 comprises a tank 30 which contains a heat transfer fluid, such as a diathermic oil. The tank 30 is positioned inside the central compartment 22 of the first container 20 for reasons of weight balance of the first container 20. The tank 30 is positioned resting on the bottom of the central compartment 22 leaving an upper space of the central compartment 22 free.

The compressor 60 is a four-stage compressor which is powered by the renewable energy generator 100 such as for example a photovoltaic plant or a wind power plant, wherein the renewable energy generator 100 comprises an inverter which supplies alternating electric current to the electric motor of the compressor 60. The electrical power supply of the electric motor of the compressor 60 occurs during the operation of the photovoltaic plant or the wind power plant, avoiding that the energy storage 10 necessarily comprises batteries.

The compressor 60 comprises a first compression stage in which the air enters through an inlet filter for the air of the compressor 60 and the compressor 60 carries out a first compression of the air. The compressor 60 by compressing the air generates thermal energy. A heat exchanger is provided between the compressor 60 and the pneumatic duct 70 which transports the compressed air from the first compression stage in order to exchange the thermal energy due to the operation of the compressor 60 with the air contained in the pneumatic duct 70. The pneumatic duct 70 comprises a first heat exchanger 73 which is engaged with the tank 30 such that it exchanges heat between the compressed air contained in the pneumatic duct 70 and the heat transfer fluid contained in the tank 30.

The compressor 60 comprises a second compression stage in which the compressed air arriving from the first heat exchanger 73 is compressed again by the compressor 60. Another heat exchanger is provided between the pneumatic duct 70 of compressed air of the second compression stage and the compressor 60, in order to recover the thermal energy dispersed by the compressor 60 and channel it through the pneumatic duct 70 into the tank 30. The pneumatic duct 70 of the compressed air from the second compression stage comprises a second heat exchanger 73 engaged in turn with the tank 30.

The compressor 60 comprises a third compression stage in which the compressed air arriving from the second heat exchanger 73 is compressed again by the compressor 60. Another heat exchanger is provided between the pneumatic duct 70 of compressed air of the third compression stage and the compressor 60, in order to recover the thermal energy dispersed by the compressor 60 and channel it through the pneumatic duct 70 into the tank 30. The pneumatic duct 70 of the compressed air from the third compression stage comprises a third heat exchanger 73 engaged in turn with the tank 30.

The compressor 60 comprises a fourth compression stage in which the compressed air arriving from the third heat exchanger 73 is compressed again by the compressor 60. Another heat exchanger is provided between the pneumatic duct 70 of compressed air of the fourth compression stage and the compressor 60, in order to recover the thermal energy dispersed by the compressor 60 and channel it through the pneumatic duct 70 into the tank 30. The pneumatic duct 70 of the compressed air from the fourth compression stage comprises a fourth heat exchanger 73 engaged in turn with the tank 30.

At the end of the four compression stages, the compressed air arriving from the fourth heat exchanger 73 is directed towards an inlet valve which injects the compressed air of the fourth compression stage towards the two plurality of pressure vessels 40 which are open by means of solenoid valves 43 arranged on each pressure vessel 40.

The compressor 60 comprises an electric motor comprising a radiator. The compressor 60 comprises an outlet which is connected in flow connection to a pneumatic duct comprising a heat exchanger adapted to exchange heat between the compressed air emitted by the compressor 60 and the heat transfer fluid contained in the tank 30.

The first container 20 comprises a chimney 28 arranged above the compressor 60, in which the chimney 28 is suitable for air circulation for the compressor 60 during the compression stages of the compressed air injected into the two plurality of pressure vessels 40.

The first container 20 also provides for the presence of further air intakes for the compressor 60 which are not shown in the figures.

The energy storage 10 compresses the air by storing it as compressed air inside the two plurality of pressure vessels 40 during the operation of the renewable energy generation plant.

The energy storage 10 is connected to the renewable energy generation plant and is electrically connected to capacitors which can be part of the energy storage 10 and assembled inside the first container 20 or can be external to the first container 20 and for example be assembled with the renewable energy generation plant.

The capacitors represent a common power bus for powering the electric motor of the four-stage compressor 60 of the energy storage 10 and for directly supplying the electrical utilities connected to the electric generation plant.

When the utilities connected to the electric generation plant and to the energy storage 10 require more energy than that is available through the common power bus, then the electric turbine 80 is put into operation by opening the plurality of solenoid valves 43 of the two plurality of pressure vessels 40 by means of a regulating valve 48.

It is possible to regulate the flow of compressed air through the regulating valve 48 connected to the plurality of pneumatic ducts 70 outletting from the two plurality of pressure vessels 40. For example, it is possible to choose to deliver compressed air only from some pressure vessels 40 of the two plurality of pressure vessels 40 by opening only some of the solenoid valves 43.

According to the necessary energy requirements, the electronic processor can control only the opening or closing of some of the solenoid valves 43 of the plurality of solenoid valves 43 of the two plurality of pressure vessels 40.

The electric turbine 80 is set in rotary motion by means of the compressed air released from the two plurality of pressure vessels 40 generating electric current.

The compressed air outletting from the two plurality of pressure vessels 40 is channeled in a pneumatic outlet duct 74 of the plurality of pneumatic ducts 70. The pneumatic outlet duct comprises an outlet heat exchanger 75 adapted to further heat the compressed air contained in the outlet pneumatic duct 74. The outlet heat exchanger 75 is engaged with the tank 30 such that it exchanges heat between the tank 30 and the compressed air contained in the outlet pneumatic duct 74.

The outlet pneumatic duct 74 can comprise two or more outlet heat exchangers 75 in order to heat more the compressed air contained in the outlet pneumatic duct 74 and inject it at even higher energy onto the electric turbine 80.

Preferably, the energy storage 10 comprises a regulating valve 48 adapted to regulate advantageously the flow of compressed air towards the electric turbine 80 such that the electric current delivered by the electric turbine 80 can be regulated.

The compressed air which is delivered by the two plurality of pressure vessels 40 and which is further heated by the at least one outlet energy exchanger 75 is directed onto blades of the electric turbine 80 which by rotating generates electric current.

The electric current generated by the electric turbine 40 of the energy storage 10 is sent to the inverters of the electricity generation plant to be fed into the common power bus and from there sent to the electrical utilities.

Advantageously, the heat transfer fluid contained in the tank 30 is heated by the plurality of heat exchangers 73 which convey the compressed air from the compressor 60 of the plurality of compression stages towards the heat transfer fluid.

Advantageously, the heat transfer fluid heated during the stages of compression of the compressed air allows further heating the compressed air delivered by the two plurality of pneumatic tanks 40 and directed towards the electric turbine 80 allowing a greater energy of the compressed air injected on the blades of the electric turbine 80 so that more electricity is produced.

The energy storage 10 can operate without batteries. Advantageously, the energy storage 10 has thus no problems related to battery life or problems related to battery disposal.

Preferably and even more advantageously, it is provided for electric heaters 33 to be inside the first container 20 and to be part of the energy storage 10 such that the electricity is recovered in the form of heat transmitted to the heat exchangers assembled with the tank 30 to further heat the transfer fluid contained in the tank 30.

The mentioned FIGS. 5-21 show the generator of electricity 100 from renewable energy sources comprising a second container 200, a plurality of photovoltaic panels 300, a foldable support frame 400 which provides the plurality of photovoltaic panels 300 and is assembled with the second container 200, three wind turbines 500 including wind blades 550, three retractable support frames 600 for the three wind turbines 500.

Said generator of electricity 100 from renewable energy sources co-operates synergistically with the energy storage 10 of FIGS. 1-4 to form the transportable energy generation and storage apparatus.

The generator of energy 100 from renewable energy sources co-operates synergistically with said energy storage 10 supplying energy from renewable energy sources to said energy storage 10 and allowing the transportable energy generation and storage apparatus to be even more transportable and autonomous to generate and store electricity.

The electricity generator 100 comprises at least one inverter assembled with the second container 200 and at least one electrical connector for being connected with electrical utilities.

Each photovoltaic panel comprises a plurality of photovoltaic cells.

The electricity generator 100 is an off-grid system that allows a rapid electrification of areas not connected to an electrical network such as rural, mountain areas or territories affected by natural or other calamities. The electricity generator 100 during transportation is contained in the second container 200 which comprises ISO standard sizes for second commercial intermodal containers of parallelepiped shape and comprises a length of 20 feet high cube, i.e. 606 cm, a height of 9 feet and 6 inches, i.e. 290 cm, and a width of 8 feet, i.e. 244 cm. The electricity generator 100 advantageously allows maximising the use of photovoltaic or wind energy, which by nature is not constant over time but depends on solar lighting and the strength of the wind.

The electricity generator 100 further comprises a process which can be implemented electronically through a software for electronic computer comprising at least one memory and at least one processor, wherein the process controls the electricity generator 100 to supply the electricity to utilities that are electrically connected with the electricity generator 100.

The electronic processor further comprises sensors which measure the strength of the wind, the solar lighting and the electric current delivered during the operation of the wind turbines 500 and of the plurality of photovoltaic panels 300. These measures allow a computer program implemented in the memory of the electronic computer to control the electricity generator 100 based on the strength of the wind and based on solar lighting.

Advantageously, the transportable energy generation and storage apparatus can be installed and assembled quickly and easily and is easily transportable to any corner of the planet, since even only two containers 20 and 200 are sufficient.

Advantageously, the dimensions of the second container 200 allow easy transportation of the electricity generator 100 both by road by means of a truck of a freight train and by water by means of cargo ships.

The electricity generator 100 may also comprise capacitors which represent a common power bus for directly supplying the electric utilities connected to the electricity generator 100.

The electric current generated by the electricity generator 100 is fed directly into the common power bus, or sent to the inverters of the electricity generator 100 to then be fed into the common power bus and from there sent to the electrical utilities.

The energy storage 10 is one of the electrical utilities. The generator 100 can also be connected with other electrical utilities such as for example a pre-existing electrical network which directly supplies electricity to other electrical utilities.

The foldable support frame 400 for the plurality of photovoltaic panels 300 can be described in detail starting from step of assembly of the foldable support frame 400 shown in FIGS. 9-14.

The foldable support frame 400 comprises a first portion 800, a second portion 900 and a plurality of rods and tie rods adapted to reinforce the structure of the foldable support frame 400.

FIGS. 9 and 10 show the second container 200 comprising a half-uncovered front face.

A front portion 220 of the second container 200 comprises two front housings 230. Each front housing 230 comprises dimensions adapted to contain the first portion 800 of the foldable support frame 400 in a configuration folded inside the second container 200, in which the first portion 800 comprises three quadrangular frames 810-830 slidably assembled the one with respect to the other by means of respective longitudinal linear guides 840. A longitudinal geometric axis is identified in a direction parallel to the length of the second container 200.

The three quadrangular frames 810-830 are a first quadrangular frame 810, a second quadrangular frame 820 and a third quadrangular frame 830.

The first quadrangular frame 810 is arranged on a first geometric plane, the second quadrangular frame 820 is arranged on a second geometric plane parallel to the first geometric plane, the third quadrangular frame 830 is arranged on a third geometric plane parallel to the first and to the second geometric plane.

The second geometric plane is arranged in the middle between the first and the third geometric plane.

Each of the three quadrangular frames 810-830 comprises an upper frame 860 and a lower frame 870 shown in FIG. 13 which are slidably assembled with each of the three quadrangular frames 810-830 by means of side linear guides 850 in FIG. 12.

The quadrangular frame 810-830 comprises at least two side bars which hold a central photovoltaic panel 310.

The side bars of the quadrangular frame 810-830 provide at least two pairs of side linear guides 850, a pair of upper side linear guides slidably provide the upper frame 860 and a pair of lower side linear guides slidably provide the lower frame 870.

The upper frame 860 comprises at least two side bars each of which is assembled with the upper side linear guide of the pair of upper side linear guides. Said at least two side bars of the upper frame 860 hold an upper photovoltaic panel 360.

The lower frame 870 comprises at least two side bars each of which is assembled with the lower side linear guide of the pair of lower side linear guides. Said at least two side bars of the lower frame 870 hold a lower photovoltaic panel 370.

As shown in FIG. 12, a first of a pair of longitudinal linear guides 840 is assembled with two side bars of the first quadrangular frame 810 and with two side bars of the second quadrangular frame 820 such that the second quadrangular frame 820 slides longitudinally with respect to the first quadrangular frame 810.

A second of a pair of longitudinal linear guides 840 is assembled with two side bars of the second quadrangular frame 820 and with two side bars of the third quadrangular frame 830 such that the third quadrangular frame 830 slides longitudinally with respect to the second quadrangular frame 820.

FIGS. 9 and 10 show a first step of construction of the first portion 800 of the foldable support frame 400 housed in the front right housing 230 of the second container 200.

In particular, FIG. 10 shows a base of the second portion 900 of the support frame 400.

The base of the second portion 900 of the support frame 400 comprises six quadrangular base modules 910 arranged one next to the other in series along the longitudinal direction.

Each quadrangular base module 910 comprises four rods 920-950 arranged along the perimeter of the quadrangular base module 910 to form a geometric square. The four rods 920-950 are two longitudinal rods 920 and 940 and two transverse rods 930 and 950.

A transverse geometric axis is identified in a direction parallel to the width of the second container 200.

The four rods 920-950 are firmly connected to each other by means of mechanical connectors. Each quadrangular base module 910 is reinforced by further four oblique rods 960, each of which is arranged to join the opposite vertices of the geometric square of the quadrangular base module 910 with a centre of the geometric square. Furthermore, a median transverse rod 970 is arranged as a further reinforcement of the square shape of the quadrangular base module 910 and which passes through a geometric centre of the geometric square of the quadrangular base module 910 and which is connected with the central portion of the two longitudinal rods 920 and 940 of the quadrangular base module 910.

Two quadrangular base modules 910 are arranged in front of the front face 220 of the second container 200. The two quadrangular base modules 910 arranged in front of the face are pivoted with the front face 220 of the second container so as to pass from a position folded on the face 220 of the second container 200 to an unfolded position as shown in the figures.

The rods 920-950 of the quadrangular base module 910 are as long as half the length of the second container 200 such that each quadrangular base module 910 can support a weight of only one of the three quadrangular frames 810-830.

In particular, the two quadrangular base modules 910 arranged in front of the front face of the second container 200 are arranged so as to act as a support base for the two first quadrangular frames 810.

The two quadrangular base modules 910 adjacent to the two quadrangular base modules 910 arranged in front of the front face of the second container 200 are arranged so as to act as a support base for the two second quadrangular frames 820.

The two extreme quadrangular base modules 910 are arranged so as to act as a support base for the two third quadrangular frames 830.

The six quadrangular base modules 910 arranged in series along the longitudinal direction provide a pair of longitudinal rails 980 which are arranged along two longitudinal axes parallel to each other as shown in particular in FIG. 10.

As shown in FIG. 11, a second step of construction of the foldable support frame 400 provides that the first portion 800 consisting of the three quadrangular frames 810-830 fixed together is extracted from the front housing 230 of the second container 200.

The three quadrangular frames 810-830 are fixed together during transportation of the second container 200 in a locked configuration in which the three quadrangular frames 810-830 are locked in the mutual sliding.

The three quadrangular frames 810-830 fixed together for transportation comprise an upper portion which is pivoted with the second container 200 such that the three frames together can translate outwards and rotate around a pin 280 that identifies an axis of rotation which is in the longitudinal direction. The translation takes place by means of a push actuated by screw jacks which are assembled on four slides, two slides fixed to an inner wall of the housing 230 and two slides fixed laterally to the group of the three quadrangular frames 810-830. The upper portion of the three quadrangular frames 810-830 pivoted with the second container 200 corresponds to an upper portion of the first quadrangular frame 810 which is pivoted with the pin 280 assembled with an upper portion of an inner wall of the housing 230 of the second container 200.

During the steps of construction of the support frame 400 for the plurality of photovoltaic panels 300 a crane 1000 is fitted on an upper portion 210 of the second container 200.

The crane 1000 can be housed inside the second container 200 when transporting the electricity generator 100.

The crane 1000 hooks at least one rope to a portion of the three quadrangular frames 810-830 joined together and rotates the three quadrangular frames 810-830 joined together around the longitudinal axis of the pin 280 such that the three quadrangular frames 810-830 joined together are extracted from the front housing 230 of the second container 200 by rotating them until the geometric planes identified by the three quadrangular frames 810-830 are inclined at an acute angle of inclination with respect to the ground.

The acute angle of inclination of the geometric planes of the three quadrangular frames 810-830 is comprised between 10 and 40 sexagesimal degrees. The acute angle of inclination corresponds to the angle of inclination that must be maintained by the photovoltaic panels 300 when the foldable support frame 400 is fully assembled and the angle of inclination with respect to the ground is chosen according to a calculation of energy efficiency produced by the electricity generator 100, in which the calculation also takes into consideration a latitude of a place where the electricity generator 100 is positioned. The acute angle calculation also takes into account how to direct a greater wind airflow towards the wind turbines 500.

Once the three quadrangular frames 810-830 are in an inclined position of the acute angle of inclination with respect to the ground, a support trolley 450 is placed under each quadrangular frame 810-830 such that it can bear the weight and support the respective quadrangular frame 810-830.

The support trolley 450 of the foldable support frame 400 comprises a plurality of pairs of wheels assembled rotatably and slidably with the pair of longitudinal rails 980 such that the support trolleys 450 can be guided by the pair of longitudinal rails 980. Preferably each support trolley 450 is as long as a quadrangular base module 910 such that the weight of the three support frames 810-830 is discharged onto each of the respective quadrangular base modules 910.

The support trolleys 450 are six, one for each left and right quadrangular frame 810-830.

The quadrangular frames 810-830 pass from the locked configuration to a free-to-slide configuration in which the three quadrangular frames 810-830 are free to slide mutually between them.

As shown in particular in FIG. 12, for the assembly of the foldable support frame 400, it is provided for the second quadrangular frame 820 to be made to slide on the longitudinal linear guides 840 with respect to the first quadrangular frame 810 and a second support trolley 450 to be positioned under the second quadrangular frame 820.

It is then provided for the third quadrangular frame 830 to be made to slide on the longitudinal linear guides 840 with respect to the second quadrangular frame 820 and a third support trolley 450 to be positioned under the third quadrangular frame 830.

Once these operations have been carried out, a first support trolley 450 is positioned under the first quadrangular frame 810. Alternatively, the first support trolley 450 can be positioned before the second support trolley 450.

Following these operations, as shown in particular in FIGS. 13 and 14, each of the upper frames 860 and each of the lower frames 870 are made to slide on the side linear guides 850 with respect to the central portions of the respective quadrangular frames 810-830 such that the central photovoltaic panels 310, the upper 360 and lower 370 ones of each of the quadrangular frames 810-830 are fully unfolded as shown in FIGS. 6 and 7.

The same operation of unfolding the three left quadrangular frames 810-830 takes place for the left front housing 230 in a specular manner with respect to what has been described for unfolding the three right quadrangular frames 810-830 for the right front housing 230 as has been shown in FIGS. 9-14 and described above.

To maintain the foldable support frame 400 firmly in position in the unfolded configuration of all the photovoltaic panels 300, additional rods and tie rods are assembled in order to create triangular structures that give greater rigidity to the foldable support frame 400 and anchor it better to the ground and to the second container 200.

As shown in particular in FIGS. 5 and 6, the photovoltaic panels 300 are electrically connected to each other and to the second container 200 by means of electrical connections 130 which are connected to at least one inverter provided inside the second container 200.

Preferably the photovoltaic panels 300 are semi-flexible photovoltaic panels having a weight comprised between 1.5 and 3.5 kg/m$^2$. The semi-flexible photovoltaic panels can be assembled with the quadrangular frames 810-830 by means of industrial velcro.

As shown in particular in FIGS. 15-17 the second container 200 comprises a rear portion 240 which is opposite to the front portion 220.

The three wind turbines 500 are two side wind turbines 510 assembled with respective two retractable side support frames 610 of the three retractable support frames 600.

The upper portion 210 of the second container 200 turned towards the rear portion 240 comprises two upper side housings 250 hollowed out inside the upper portion 210. Each of the two upper side housings 250 comprises inner walls which provide at least one pair of vertical linear guides 26 adapted to slidably provide at least one portion of the side retractable support frame 610 for the side wind turbine 510.

The two retractable side support frames 610 are assembled retractable with the respective upper housing 250 of the second container 200, in which each retractable side support frame 610 during the step of assembly of the side wind turbines 510 passes from a position inside the respective upper housing 250 as shown in FIG. 16 to a position extracted from the respective upper housing 250 as shown in FIG. 17.

The retractable side support frame 610 comprises a plurality of rods and tie rods for assembling the respective side wind turbine 510.

The side wind turbine 510 provides wind blades 550 adapted to enable the rotation of the wind turbine 510 in order to produce electric current.

Each wind turbine 500 is connected through electrical connectors to the second container 200.

As shown in particular in FIGS. 18-21 a central wind turbine 520 of the three wind turbines 500 is assembled with a central retractable support frame 620 of the three retractable support frames 600 for the three wind turbines 500.

The central retractable support frame 620 for the central wind turbine 520 is rotatably assembled with a central pin 280 which is arranged inside a rear central housing 270 of the second container 200. The rear central housing 270 of the second container 200 comprises inner walls comprising a support for the central pin 280. The rear central housing 270 of the second container 200 comprises dimensions suitable for housing the central retractable support frame 620 of the central wind turbine 520 during transportation of the second container 200.

During a step of assembly of the central retractable support frame 620, the central retractable support frame 620 is rotated around the central pin 280 by extracting the central retractable support frame 620 from the rear central housing 270 and positioning it vertically with respect to the ground as shown in particular in FIGS. 20 and 21.

It should be noted that the central retractable support frame 620 comprises a lower portion 630 and an upper portion 640.

The upper portion 640 provides the central wind turbine 520 and is pivoted with the central pin 280.

The lower portion during transportation of the second container 200 is assembled inside the central rear housing 270 as shown in FIG. 18. The lower portion 630 of the central retractable support frame 620 comprises a plurality of wheels adapted to enable moving the central retractable support frame 620 to a distance from the second container 200.

The lower portion 630 of the central retractable support frame 620 comprises a telescopic portion for supporting the upper portion 640 of the central retractable support frame 620.

FIG. 21 shows a guide plane 990 adapted to allow the wheels of the lower portion 630 of the central retractable support frame 620 to slide.

For structural reasons, the three wind turbines 500 are positioned at a predefined distance from each other as shown in particular in FIG. 6. The central wind turbine 500 is moved to a distance from the second container 200 by sliding the wheels of the central retractable support frame 620 on the guide plane 990 towards an opposite direction with respect to the photovoltaic panels 300.

The three retractable support frames 600 for the three wind turbines 500 are fixed to the soil and to the second container by means of additional rods and tie rods.

Operationally, during the steps of construction of the wind blades 550 and the wind turbine 500 are assembled with the respective retractable support frames 600 as soon as the retractable support frames 600 are fixedly positioned with the second container 200 and with the ground.

It should also be noted that the acute angle of inclination of the geometric planes of the three quadrangular frames 810-830 allows diverting the airflow in the direction of the wind turbines 500 to advantageously maximize the airflow rate and thus advantageously maximize the revolutions of the wind turbine 500 and therefore the amount of energy produced.

Advantageously, the structure of the foldable support frame 400 in the unfolded configuration of the photovoltaic panels 300 allows to increase the cooling of the photovoltaic panels 300 and consequently their yield.

Advantageously, the generator of electricity 100 from renewable energy sources according to the present invention is both easily transportable in a second ISO standard intermodal container 200 to anywhere on the planet and is both easy and quick to assemble and disassemble in any place.

Advantageously, the electricity generator 100 according to the present invention is capable of electrifying an area without electric current in a short time or helping to reinforce the pre-existing electric network.

Advantageously, the electricity generator 100 has a frame structure that withstands wind stresses up to at least 200 km/h.

Advantageously, the transportable energy generation and storage apparatus is both easily transportable and easy and quick to assemble and disassemble.

Advantageously, the transportable energy generation and storage apparatus is able to manage the energy flows being generated, stored and used of the electrical utilities that are connected to it, so-called island loads.

Alternatively, it is possible to provide that the energy storage 10 can be fitted with batteries for auxiliary reasons, but which are not necessary for the normal operation of the energy storage 10 according to the present invention.

Alternatively, for safety reasons, each of the two plurality of pressure vessels 40 comprises an inlet solenoid valve which controls the inlet and outlet of the compressed air from the two plurality of pressure vessels 40.

Alternatively, it is possible to provide that the first container 20 can be a first ISO standard container of 40 feet, that is, of 1220 cm.

Alternatively, it is possible to provide that the energy storage 10 can be connected both with renewable energy generators such as for example photovoltaic plants or wind power plants, and with endothermic engines, both with an electric grid line, and with other renewable energy source, and a plurality of electricity generators.

Alternatively, it is possible to provide that the energy storage 10 comprises a compressor 60 for each compression stage.

Alternatively, it is possible to provide that at least one compressor 60 comprises a plurality of compression stages and that said at least one compressor 60 compresses for a plurality of compression stages compressed air providing that a pneumatic duct 70 of said plurality of ducts 70 connects an outlet of said at least one compressor 60 with an inlet of said at least one heat exchanger 73 assembled with said tank 30 and that said pneumatic duct 70 connects an outlet of said at least one heat exchanger 73 with an inlet of said at least one compressor 60. It is possible to provide for the pneumatic duct 70 to connect said at least one compressor 60 and said heat exchanger 73 several times such that the compressed air contained in the pneumatic duct is subjected to a plurality of compression stages.

Alternatively, it is provided that the tank 30 containing the heat transfer fluid heated during the stages of compression of the compressed air is connected to a heat exchanger which conveys the heat to a district heating network or to other energy storages 10 for further external utilities which can be the same electrical utilities supplied by the electric current of the electric turbine, or other utilities that use only district heating. In this alternative, it is provided for the heat to be exchanged between the heat transfer fluid contained in the tank 30 and another heat transfer fluid contained in the external district heating network or towards other energy storages 10.

Alternatively, the excess heat coming from the compression stages and which cannot be further stored by the tank 30 can be destined for further heat storages 10.

Alternatively, it is provided that there is only one plurality of pressure vessels 40 arranged inside the inner space of the first container 20.

Alternatively, the two plurality of pressure vessels 40 are not necessarily arranged inside one of the two side compartments, but can for example be arranged inside the central compartment, or further arrangements are possible inside the inner space of the first container 20.

Alternatively, it is provided for the tank 30 to be arranged inside the inner space of the first container 20.

Alternatively, it is provided that the tank 30 is not necessarily arranged in the central compartment 22, but can for example be arranged in one of the two side compartments 21 or further arrangements are possible inside the inner space of the first container 20.

Alternatively, it is provided that the storage comprises a plurality of tanks 30.

Alternatively, the tanks 30 are two and are respectively arranged inside each of the two side compartments 21.

Alternatively, a plurality of heat transfer fluids is provided, i.e. a type of heat transfer fluid for each of the plurality of tanks 30.

Alternatively, the first container 20 is provided to comprise a single inner space which is not subdivided into compartments 21, 22.

Alternatively, it is provided that the compressed air arriving from an upstream heat exchanger 73 is directed only towards some inlet valves which inject the compressed air of the respective compression stage towards the at least one plurality of pressure vessels 40.

Alternatively, the electric current generated by the electric turbine 80 can be fed directly into the common power bus, or delivered directly to the electrical utilities which require greater electrical power.

Alternatively, it is possible to provide that the second container 200 can be a second ISO standard container of 40 feet, i.e. of 1220 cm.

Alternatively, it is possible to provide that there are more than three quadrangular frames 810-830 slidably assembled the one with respect to the other by means of respective longitudinal linear guides 840.

Alternatively, it is possible to provide that there are only two quadrangular frames 810 and 820 slidably assembled the one with respect to the other.

Alternatively, it is possible to provide that at least one of the quadrangular frames 810-830 comprises only an upper frame 860 or still alternatively only a lower frame 870.

Alternatively, it is possible to provide that two adjacent quadrangular base modules 910 can have a rod of the four 920-950 in common.

Alternatively, it is possible to provide that the quadrangular frames 810-830 are not inclined with respect to the ground and lie on geometric planes parallel to the walls of the second container 200.

Alternatively, it is possible to provide that the wind turbines 500 are more than three.

Alternatively, it is possible to provide that there is at least one wind turbine 500.

Alternatively, it is possible to provide that the second container 200 does not include the wind turbines 500, but only the photovoltaic panels 300.

Alternatively, said transportable energy generation and storage apparatus comprising an energy storage 10 supplied by a plurality of energy generators 100 from renewable energy sources.

The invention thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. An energy storage comprising:
   a first container comprising an inner space,
   at least one plurality of pressure vessels for compressed air that are arranged inside the inner space of the first container,
   at least one tank containing a heat transfer fluid arranged inside the inner space of the first container,
   at least one compressor adapted to compress air,
   a plurality of pneumatic ducts for compressed air connected with said at least one compressor, wherein the plurality of pneumatic ducts comprises a plurality of heat exchangers adapted to enable a heat exchange between compressed air contained in said plurality of pneumatic ducts and heat transfer fluid contained inside said at least one tank, wherein the plurality of pneumatic ducts is connected to said at least one plurality of pressure vessels to supply pressure vessels with compressed air,
   an electric turbine connected by means of a plurality of pneumatic ducts with said at least one plurality of pressure vessels adapted to supply compressed air for rotating the electric turbine such that it can generate electric current,
   wherein said at least one plurality of pressure vessels are arranged inside the inner space of the first container in rows of pressure vessels stacked one over the other such that a row of pressure vessels arranged below support a row of pressure vessels arranged above.

2. The energy storage according to claim 1, wherein said plurality of pneumatic ducts comprises an outlet pneumatic duct that connects said at least one plurality of pressure vessels with said electric turbine, wherein said outlet pneumatic duct comprises at least one outlet heat exchanger assembled with said at least one tank such that it exchanges heat between the heat transfer fluid contained inside said at least one tank and the compressed air contained in the outlet pneumatic duct and directed towards the electric turbine.

3. The energy storage according to claim 1, wherein said compressor comprises an outlet duct for compressed air outletting from said compressor and said outlet duct comprises at least one heat exchanger assembled with said at least one tank.

4. The energy storage according to claim 1, wherein said at least one compressor is a compressor at a plurality of compression stages.

5. The energy storage according to claim 1, wherein said at least one compressor compresses for a plurality of compression stages compressed air providing that a pneumatic duct of said plurality of ducts connects an outlet of said at least one compressor with an inlet of said at least one heat exchanger assembled with said at least one tank and wherein said pneumatic duct connects an outlet of said at least one heat exchanger with an inlet of said at least one compressor.

6. The energy storage according to claim 1, wherein said inner space of the container is subdivided into three compartments, two side compartments and a central compartment,
   wherein said at least one plurality of pressure vessels are two pluralities of pressure vessels that are respectively stacked inside each side compartment,
   wherein said at least one tank is arranged inside the central compartment.

7. The energy storage according to claim 1, characterized in that it comprises further comprising at least one containment cage,
wherein said at least one plurality of pressure vessels is stacked inside said containment cage.

8. The energy storage according to claim 1, characterized in that wherein each pressure vessel of said at least one plurality of pressure vessels comprises a cylindrical portion that comprises an axis of symmetry which is arranged parallel to a width of the first container such that pressure vessels are arranged the one next to the other in a row and that rows of pressure vessels are arranged one over the other.

9. The energy storage according to claim 1, further comprising at least one capacitor adapted to be electrically connected with said at least one power generator and being supplied with electric current by said electric turbine.

10. The energy storage according to claim 1, wherein said at least one tank provides a heat exchanger adapted to exchange heat between the heat transfer fluid contained inside said at least one tank and another heat transfer fluid contained in an outer district heating network or still another heat transfer fluid contained inside at least one another tank of another energy storage.

11. A transportable energy generation and storage apparatus, comprising said energy storage according to claim 1 and at least one generator of energy from renewable energy sources which co-operates with said energy storage supplying energy to said energy storage,
wherein said at least one power generator comprises a second container, a plurality of photovoltaic panels, a foldable support frame which passes from a configuration folded inside the second container to a configuration unfolded externally, in which the foldable support frame provides the plurality of photovoltaic panels.

12. The transportable energy generation and storage apparatus according to claim 11, wherein said foldable support frame comprises a first portion adapted to pass from a configuration folded inside the second container to an unfolded configuration, wherein said first portion comprises at least two quadrangular frames slidably assembled the one with respect to the other, each of said at least two quadrangular frames is arranged on a respective geometric plane, in which the geometric planes are parallel to each other, each quadrangular frame comprises at least two side bars which hold a central photovoltaic panel of said plurality of photovoltaic panels.

13. The transportable energy generation and storage apparatus according to claim 12, wherein at least one of said at least two quadrangular frames comprises an upper frame which is slidably assembled with at least one of said at least two quadrangular frames, wherein the upper frame comprises at least two side bars which hold an upper photovoltaic panel.

14. The transportable energy generation and storage apparatus according to claim 12, wherein at least one of said at least two quadrangular frames comprises a lower frame which is slidably assembled with at least one of said at least two quadrangular frames, wherein the lower frame comprises at least two side bars which hold a lower photovoltaic panel.

15. The transportable energy generation and storage apparatus according to claim 12, wherein said second container comprises at least one housing comprising dimensions adapted to contain said at least two quadrangular frames in a configuration folded inside said at least one housing of the second container.

16. The transportable energy generation and storage apparatus according to claim 12, wherein said at least two quadrangular frames in folded position comprise a portion which is pivoted with the second container such that said at least two quadrangular frames in the folded position are adapted to rotate around a pin of the second container until said at least two quadrangular frames are positioned in a position inclined by an acute angle of inclination with respect to a soil, wherein said acute angle of inclination is comprised between 10 and 40 sexagesimal degrees.

17. The transportable energy generation and storage apparatus according to claim 12, wherein said foldable support frame comprises a second portion comprising a plurality of quadrangular base modules in an even number to said at least two quadrangular frames, wherein said plurality of quadrangular base modules are arranged in series along the longitudinal direction, wherein said longitudinal direction is identified as one parallel to a length of said second container, wherein said plurality of quadrangular base modules provide a pair of longitudinal rails which are arranged along two longitudinal axes parallel to each other,
wherein said foldable support frame comprises a plurality of support trolleys, each support trolley of said plurality of support trolleys comprises at least one pair of rotary elements adapted to be moved along said pair of longitudinal rails,
wherein each of said support trolleys supports a weight of at least one of said at least two quadrangular frames.

18. The transportable energy generation and storage apparatus according to claim 11, further comprising a plurality of wind turbines comprising wind blades, a plurality of retractable support frames each of the which supports a wind turbine of said plurality of wind turbines, it being provided that said plurality of retractable support frames passes from a configuration retractable inside the second container to a configuration assembled outside the second container.

19. The transportable energy generation and storage apparatus according to claim 18, wherein said second container comprises at least one upper housing adapted to contain a retractable support frame of said plurality of retractable support frames, wherein said retractable support frame is slidably assembled with said upper housing.

20. The transportable energy generation and storage apparatus according to claim 18, wherein said second container comprises at least one housing adapted to contain a retractable support frame of said plurality of retractable support frames,
wherein said second container comprises a pin,
wherein said retractable support frame is rotatably assembled with said pin of said second container and by rotating it passes from said configuration retractable inside the housing of said second container to the configuration assembled outside the housing of the second container.

* * * * *